(12) United States Patent
Nakahara

(10) Patent No.: US 10,594,886 B2
(45) Date of Patent: Mar. 17, 2020

(54) LIGHT EMITTING DEVICE, IMAGE READING DEVICE, AND IMAGE FORMING APPARATUS

(71) Applicant: FUJI XEROX CO., LTD., Tokyo (JP)

(72) Inventor: Masao Nakahara, Mie (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/111,225

(22) Filed: Aug. 24, 2018

(65) Prior Publication Data

US 2019/0199885 A1    Jun. 27, 2019

(30) Foreign Application Priority Data

Dec. 26, 2017    (JP) .................................. 2017-250007

(51) Int. Cl.
| | |
|---|---|
| *G06F 15/00* | (2006.01) |
| *H04N 1/03* | (2006.01) |
| *H04N 1/29* | (2006.01) |
| *H04N 1/12* | (2006.01) |
| *F21V 8/00* | (2006.01) |

(52) U.S. Cl.
CPC .......... *H04N 1/0301* (2013.01); *G02B 6/001* (2013.01); *H04N 1/1295* (2013.01); *H04N 1/295* (2013.01)

(58) Field of Classification Search
CPC .... H04N 1/0301; H04N 1/295; H04N 1/1295; G02B 6/001
USPC ......................................................... 358/1.13
See application file for complete search history.

(56) References Cited

U.S. PATENT DOCUMENTS

2014/0285857 A1* 9/2014 Yamada ................. G03B 27/54
358/474

FOREIGN PATENT DOCUMENTS

JP        H11313195         11/1999

* cited by examiner

*Primary Examiner* — Mark R Milia
(74) *Attorney, Agent, or Firm* — JCIPRNET

(57) ABSTRACT

A light emitting device includes a light-guide member that extends in one direction, a light emitting element that radiates light onto an end surface of the light-guide member, a reflective member that extends in the one direction and reflects, while holding the light-guide member, light that is emitted from a surface of the light-guide member, and a housing that accommodates the reflective member and includes a holding unit, the holding unit being configured to hold the reflective member at an accommodating position of the reflective member and configured to allow the reflective member to be released from a state of being held when the reflective member is bent in a crossing direction that crosses the one direction.

13 Claims, 19 Drawing Sheets

LIGHT EMITTING DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2017-250007 filed Dec. 26, 2017.

BACKGROUND

(i) Technical Field

The present invention relates to a light emitting device, an image reading device, and an image forming apparatus.

(ii) Related Art

For example, when an image reading device removed from the market is recycled, it is necessary to replace a reflective member and a light-guide member that deteriorate with time. In the related art, operators have removed reflective members and light-guide members fixed to housings with screws from the housings by using tools.

SUMMARY

According to an aspect of the invention, there is provided a light emitting device including a light-guide member that extends in one direction, a light emitting element that radiates light onto an end surface of the light-guide member, a reflective member that extends in the one direction and reflects, while holding the light-guide member, light that is emitted from a surface of the light-guide member, and a housing that accommodates the reflective member and includes a holding unit, the holding unit being configured to hold the reflective member at an accommodating position of the reflective member and configured to allow the reflective member to be released from a state of being held when the reflective member is bent in a crossing direction that crosses the one direction.

BRIEF DESCRIPTION OF THE DRAWINGS

An exemplary embodiment of the present invention will be described in detail based on the following figures, wherein.

DETAILED DESCRIPTION

Figure 1:
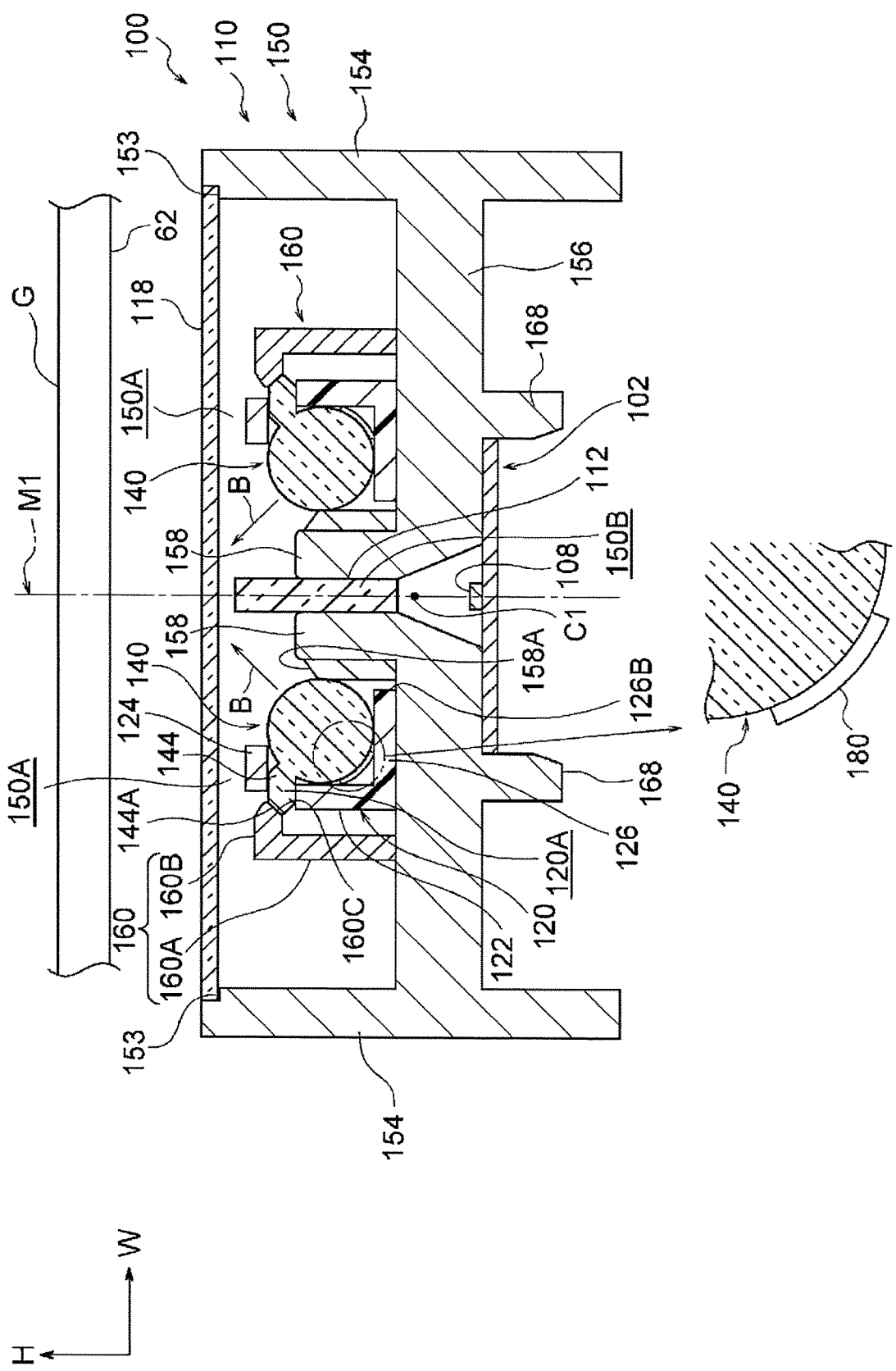
FIG. 1 is a cross-sectional view illustrating an image reading device and a light emitting device according to an exemplary embodiment of the present invention.

An example of a light emitting device, an image reading device, and an image forming apparatus according to an exemplary embodiment of the present invention will be described with reference to FIG. 1 to FIG. 19. Note that, arrow H, arrow W, and arrow D that are illustrated in the drawings respectively indicate a top-bottom direction of the image forming apparatus (the vertical direction), a width direction of the image forming apparatus (a horizontal direction), and a depth direction of the image forming apparatus (a horizontal direction).

(Overall Configuration of Image Forming Apparatus)

Figure 19:
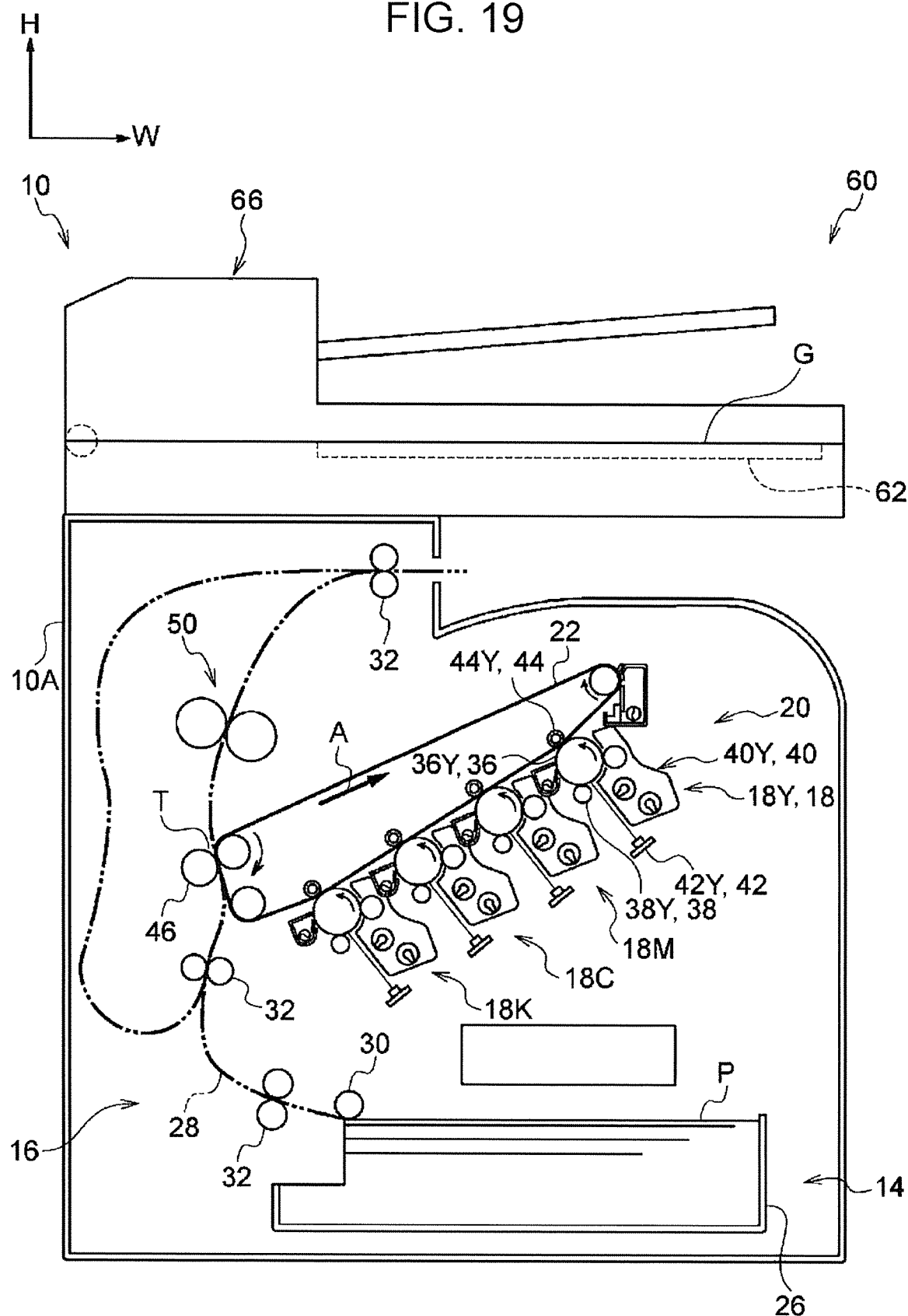
FIG. 19 is a schematic diagram illustrating a configuration of the image forming apparatus according to the exemplary embodiment of the present invention.

As illustrated in FIG. 19, an image forming apparatus 10 includes an accommodating unit 14 in which sheet members P serving as recording media are accommodated, a transport unit 16 that transports the sheet members P, which are accommodated in the accommodating unit 14, an image forming section 20 that performs an image forming operation on the sheet members P that are transported by the transport unit 16 from the accommodating unit 14, and an image reading section 60 that reads images formed on documents G. The accommodating unit 14, the transport unit 16, the image forming section 20, and the image reading section 60 are arranged in this order from the lower side to the upper side in a top-bottom direction (the direction of arrow H).

[Accommodating Unit]

The accommodating unit 14 includes an accommodating member 26 that is capable of being drawn out from a housing 10A of the image forming apparatus 10 toward the near side in a depth direction of the image forming apparatus 10 (hereinafter referred to as apparatus depth direction), and the sheet members P are stacked in the accommodating member 26. The accommodating unit 14 further includes a delivery roller 30 that sends out one of the sheet members P stacked in the accommodating member 26, the sheet member P being at the top of the sheet members P, to a transport path 28 included in the transport unit 16.

[Transport Unit]

The transport unit 16 includes plural transport rollers 32 that transport the sheet members P along the transport path 28.

[Image Forming Section]

The image forming section 20 includes four image forming units 18Y, 18M, 18C, and 18K respectively corresponding to yellow (Y), magenta (M), cyan (C), and black (K). Note that, in the following description, when it is not necessary to describe the image forming units 18Y, 18M, 18C, and 18K in such a manner as to be distinguished in terms of color, the letters Y, M, C, and K may sometimes be omitted.

The image forming units 18 for the corresponding colors are each detachable from the housing 10A. In addition, each of the image forming units 18 for the corresponding colors includes an image carrier 36, a charging roller 38 that charges a surface of the image carrier 36, and an exposure device 42 that radiates exposure light onto the charged image carrier 36. Each of the image forming units 18 for the corresponding colors further includes a developing device 40 that develops an electrostatic latent image that is formed as a result of the above-mentioned exposure device 42 irradiating the charged image carrier 36 and visualizes the electrostatic latent image as a toner image.

The image forming section 20 further includes a transfer belt 22 that has an endless loop shape and that moves circularly in the direction of arrow A in FIG. 19 and first transfer rollers 44 that transfer toner images formed by the image forming units 18 for the corresponding colors onto the transfer belt 22. The image forming section 20 further includes a second transfer roller 46 that transfers toner images that have been transferred to the transfer belt 22 onto one of the sheet members P and a fixing device 50 that fixes toner images that have been transferred to one of the sheet members P onto the sheet member P by applying heat and pressure to the sheet member P.

[Image Reading Section]

Figure 17:
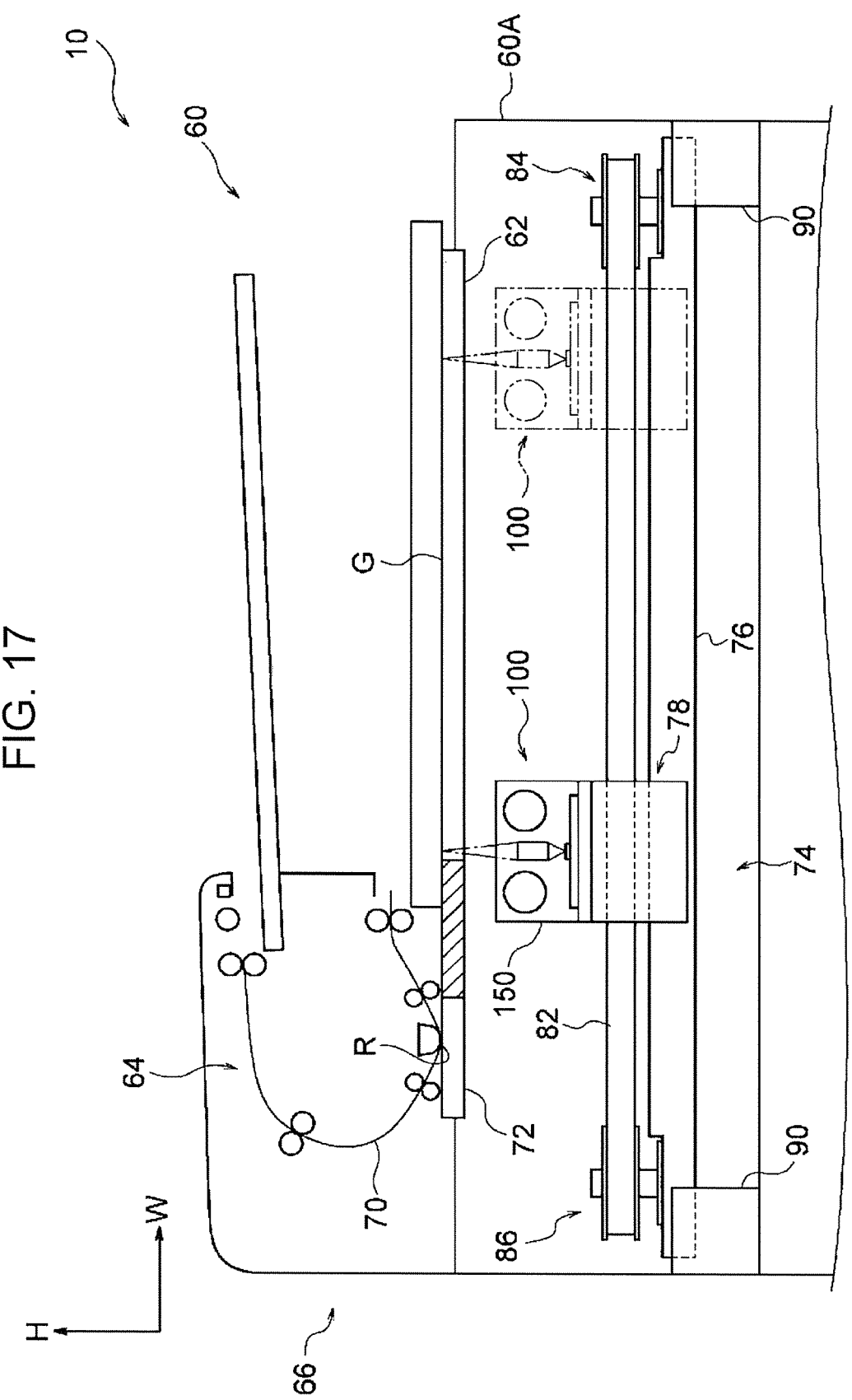
FIG. 17 is a diagram illustrating a configuration of the image reading section of the image forming apparatus according to the exemplary embodiment of the present invention.

As illustrated in FIG. 17, the image reading section 60 includes a first transparent plate 62 (a so-called platen glass) on which one of the documents G is placed when an image of the document G is read and a second transparent plate 72 that is disposed on one side of the first transparent plate 62 (on the left-hand side of the first transparent plate 62 in FIG. 17) in a width direction of the image forming apparatus 10 (hereinafter referred to as apparatus width direction). The first transparent plate 62 and the second transparent plate 72 are fitted into an upper portion of a housing 60A of the image reading section 60.

An opening and closing cover 66 that opens and closes to cover and uncover the first transparent plate 62 and the second transparent plate 72 is disposed above the first transparent plate 62 and the second transparent plate 72. A transport device 64 (a so-called auto document feeder (ADF)) is disposed in the opening and closing cover 66, and the transport device 64 transports the plural documents G along a transport path 70 that is formed in the opening and closing cover 66 and causes each of the documents G to pass through a document reading position R that is located above the second transparent plate 72.

In addition, an image reading device 100 is disposed in the housing 60A, and the image reading device 100 reads an image of one of the documents G that is placed on the first transparent plate 62 and reads an image of one of the documents G that is transported by the transport device 64 to the document reading position R. The image reading section 60 further includes a driving device 74 that drives the image reading device 100 in the apparatus width direction.

Figure 15:
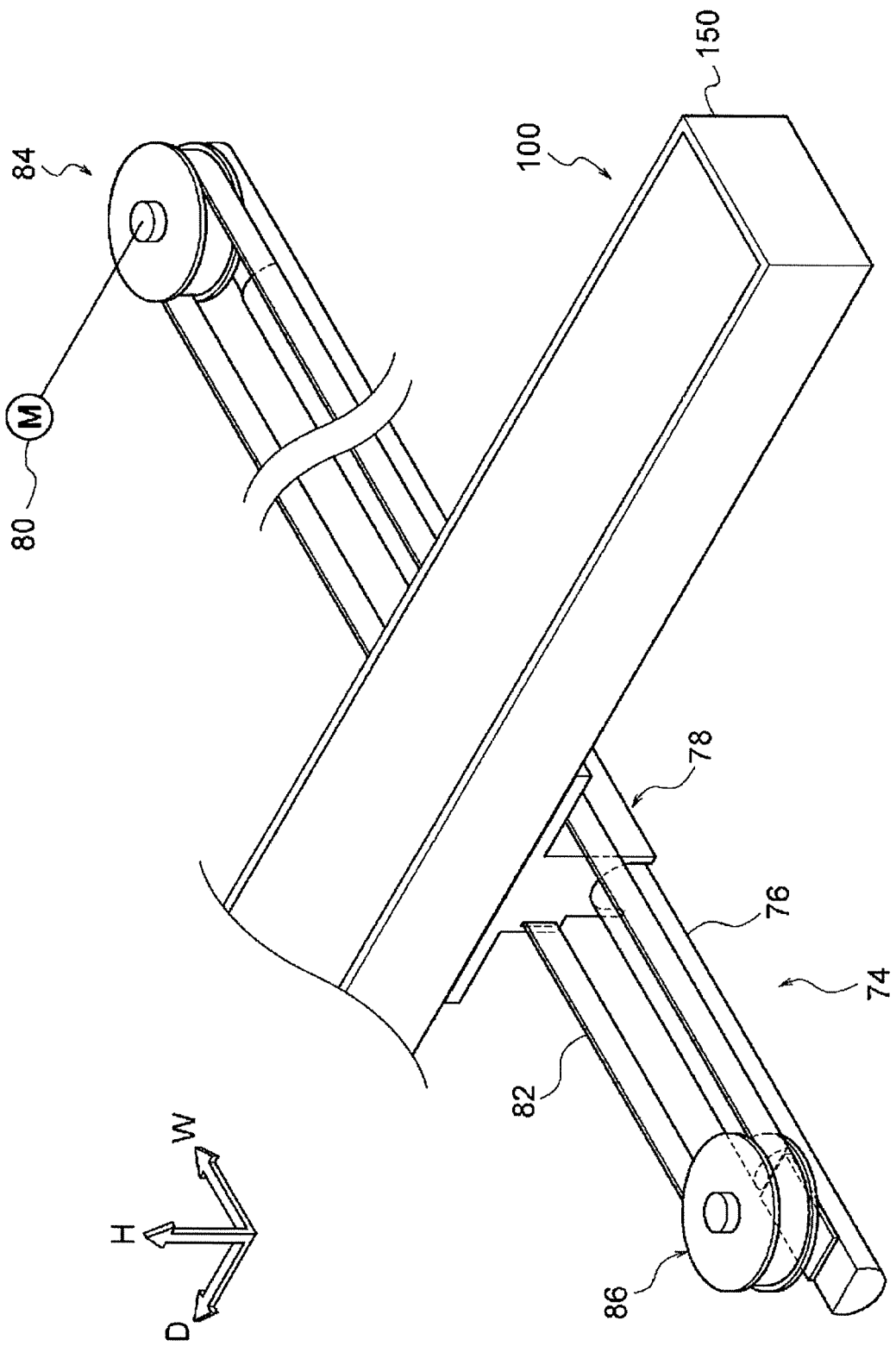
FIG. 15 is a perspective view illustrating the image reading section of the image forming apparatus according to the exemplary embodiment of the present invention.
Figure 16:
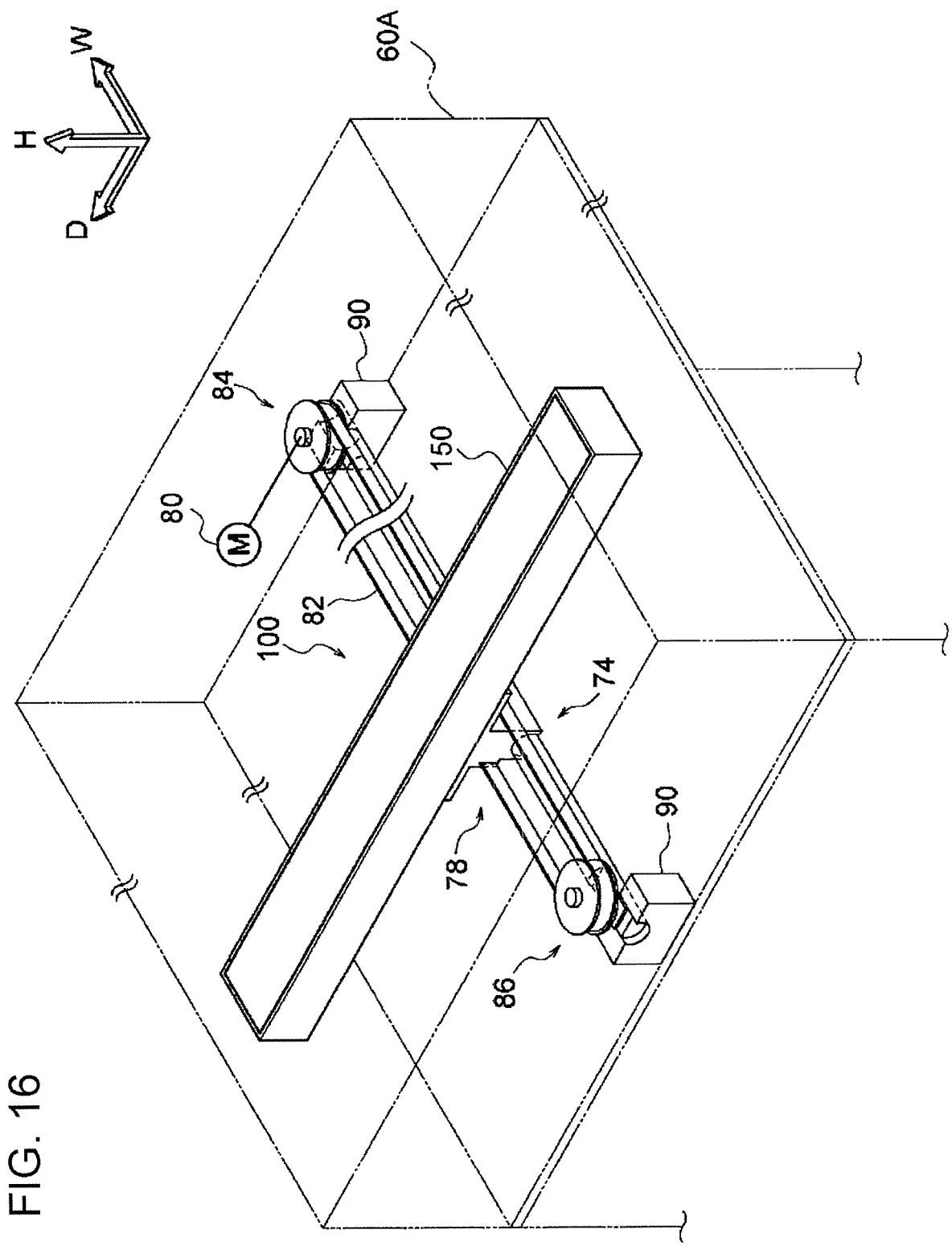
FIG. 16 is a perspective view illustrating the image reading section of the image forming apparatus according to the exemplary embodiment of the present invention.

As illustrated in FIG. 15 and FIG. 16, the driving device 74 includes a shaft 76 extending in the apparatus width direction (the direction of movement of the image reading device 100) and a sliding member 78 that is attached to the bottom surface of a housing 150 of the image reading device 100 and that is slidably supported by the shaft 76.

The driving device 74 further includes a motor 80, a drive pulley 84 that is driven so as to rotate as a result of receiving a driving force transmitted from the motor 80, a driven pulley 86 that is driven so as to rotate, and an endless belt 82 that has an endless loop shape and that is wound around the drive pulley 84 and the driven pulley 86. The drive pulley 84 is mounted on one end portion of the shaft 76, and the driven pulley 86 is mounted on the other end portion of the shaft 76.

Figure 14:
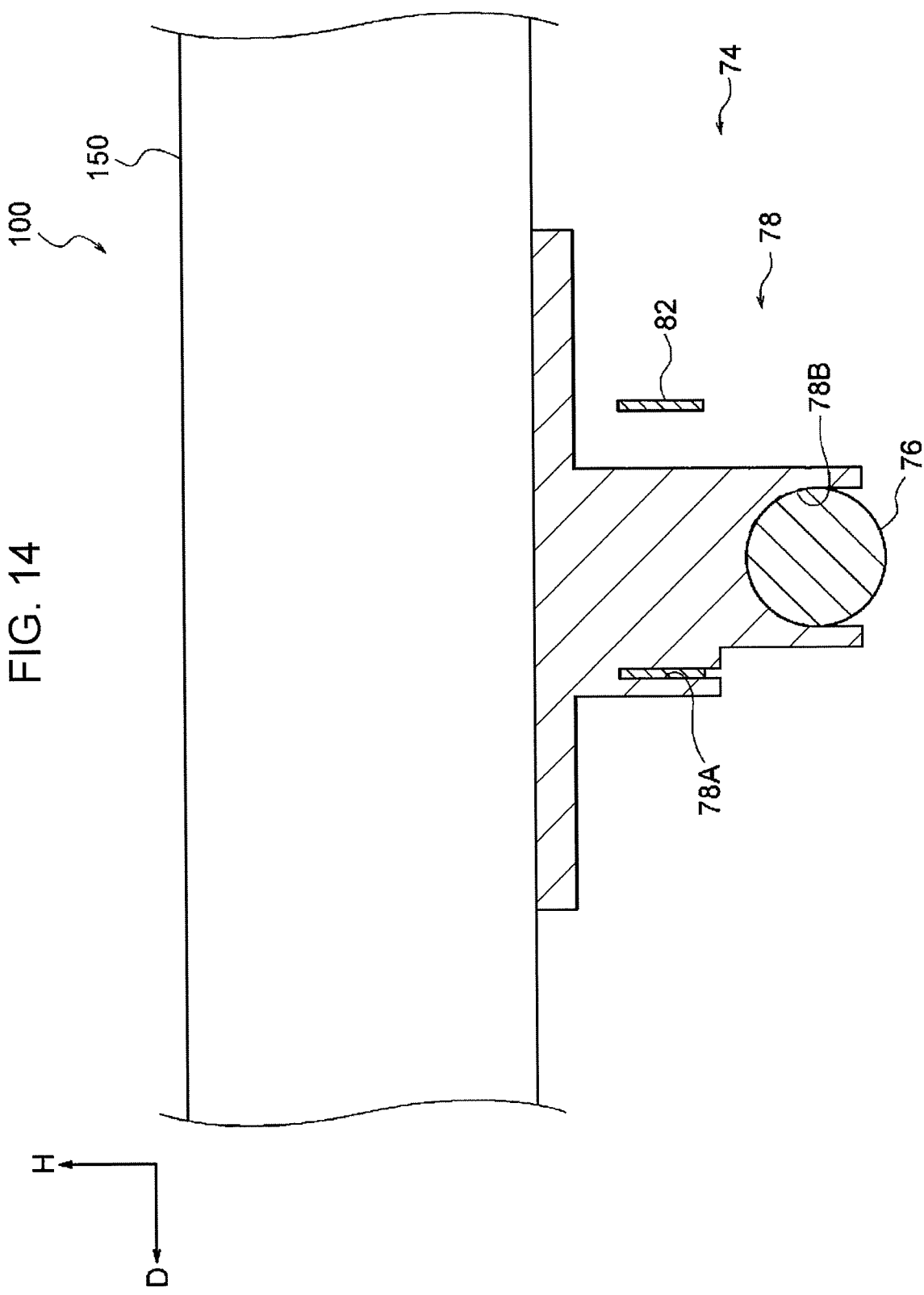
FIG. 14 is a sectional view illustrating an image reading section of the image forming apparatus according to the exemplary embodiment of the present invention.

As illustrated in FIG. 16, the sliding member 78 is attached to a center portion of the bottom surface of the housing 150 in the apparatus depth direction. As illustrated in FIG. 14, the sliding member 78 extends in the top-bottom direction and has a slit 78A into which a portion of the endless belt 82 is fitted and a sliding surface 78B that has a semicircular shape when viewed in the apparatus width direction and that slides on the shaft 76.

As illustrated in FIG. 16, in the housing 60A, a pair of support portions 90 that support the end portions of the shaft 76 from below are formed integrally with the housing 60A. Note that details of the image reading device 100 will be described later.

(Operation of Image Forming Apparatus)

In the image forming apparatus 10, an image is formed in the following manner.

Figure 18:
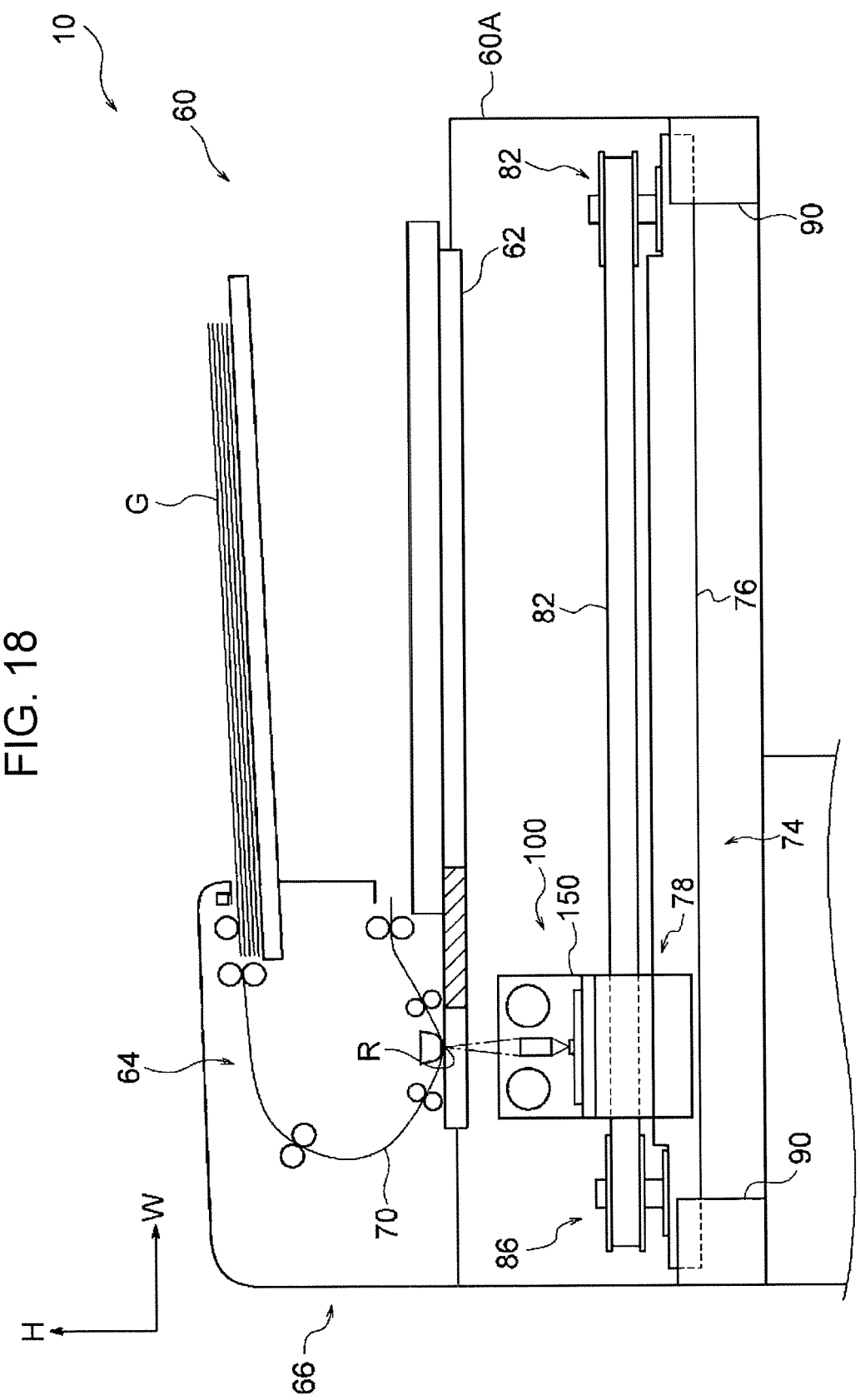
FIG. 18 is a diagram illustrating a configuration of the image reading section of the image forming apparatus according to the exemplary embodiment of the present invention.

First, the image reading section 60 reads an image of one of the documents G. More specifically, when an image of one of the documents G that is transported by the transport device 64 is read, as illustrated in FIG. 18, the driving force of the motor 80 (see FIG. 16) is transmitted to the image reading device 100 via the endless belt 82, and the image reading device 100 moves to and stops at a transport reading position that is located on a first side in the apparatus width direction. Then, the image reading device 100 located at the transport reading position reads the image of the document G transported by the transport device 64.

In contrast, when an image of one of the documents G that is placed on the first transparent plate 62 is read, as illustrated in FIG. 17, the image reading device 100 that is located at a reading start position (the position where the image reading device 100 is indicated by a solid line in FIG. 17) moves in the apparatus width direction along the first transparent plate 62 toward a reading end position (the position where the image reading device 100 is indicated by a two-dot chain line in FIG. 17) while reading the image of the document G.

Subsequently, the exposure devices 42 radiate, on the basis of image information read by the image reading section 60, the exposure light onto the surfaces of the image carriers 36 for the different colors, which have been charged by the charging rollers 38, so as to form electrostatic latent images (see FIG. 19).

As a result, electrostatic latent images that correspond to data are formed on the surfaces of the image carriers 36 for the different colors. In addition, the developing devices 40 for the different colors develop and visualize the electrostatic latent images as toner images. The toner images formed on the surfaces of the image carriers 36 for the different colors are transferred onto the transfer belt 22 by the first transfer rollers 44.

Then, one of the sheet members P sent out by the delivery roller 30 from the accommodating member 26 to the transport path 28 is sent toward a transfer position T at which the transfer belt 22 and the second transfer roller 46 are brought into contact with each other. At the transfer position T, the sheet member P is transported between the transfer belt 22 and the second transfer roller 46, so that the toner images on a surface of the transfer belt 22 are transferred onto the sheet member P.

The toner images that have been transferred to the sheet member P are fixed onto the sheet member P by the fixing device 50. Then, the sheet member P to which the toner images have been fixed is discharged to the outside of the housing 10A by the transport rollers 32.

(Configuration of Principal Portion)

The image reading device 100 will now be described.

Figure 13:
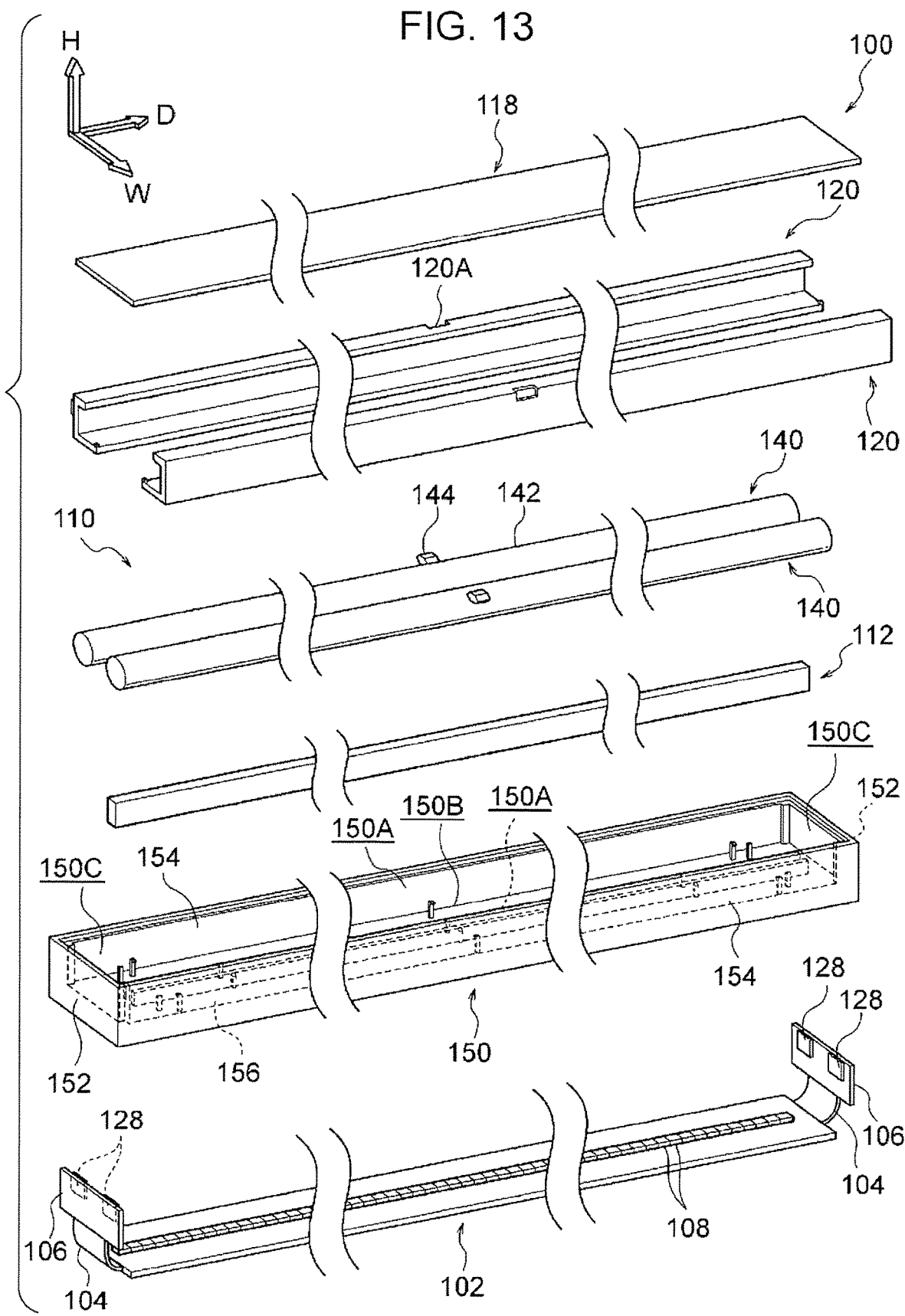
FIG. 13 is an exploded perspective view illustrating the image reading device according to the exemplary embodiment of the present invention.

The image reading device 100 (see FIG. 12) is configured to read images formed on the documents G (objects) by using a known contact image sensor (CIS) method. As illustrated in FIG. 13, the image reading device 100 includes a light receiving board 102, a pair of wiring cables 104 that are connected to the light receiving board 102, and a pair of boards 106 that are connected to the respective wiring cables 104. The image reading device 100 further includes light emitting elements 128 that are mounted on the boards 106, a pair of light-guide members 140 (lightguides) each of which has a columnar shape, a rod lens array 112 that has a rectangular parallelepiped shape, and the housing 150. The image reading device 100 further includes a pair of reflective members 120 each of which surrounds and holds one of the pair of light-guide members 140, a reflective layer 180 (see FIG. 1) that is formed on the surface of each of the light-guide members 140, and a glass plate 118 that covers the top surface of the housing 150. The rod lens array 112 is an example of a guide member.

The housing 150, the light-guide members 140, the reflective members 120, and the light emitting elements 128 are included in a light emitting device 110 that radiates light toward one of the documents G.

[Light-Guide Member 140, Reflective Layer 180]

As illustrated in FIG. 13, the pair of light-guide members 140 are provided side by side in the apparatus width direction. In addition, the pair of light-guide members 140 are accommodated in lightguide accommodating portions 150A (see FIG. 1 and FIG. 8) of the housing 150, which will be described later, in a state where each of the light-guide members 140 is held by one of the pair of reflective members 120. As illustrated in FIG. 1, the pair of light-guide members 140 are symmetrical in shape with respect to a central plane M1 that passes through the center C1 of the image reading device 100 and that is oriented in the apparatus width direction. One of the light-guide members 140 that is located on the first side in the apparatus width direction (the left-hand side in FIG. 1) will be described below.

Figure 11:
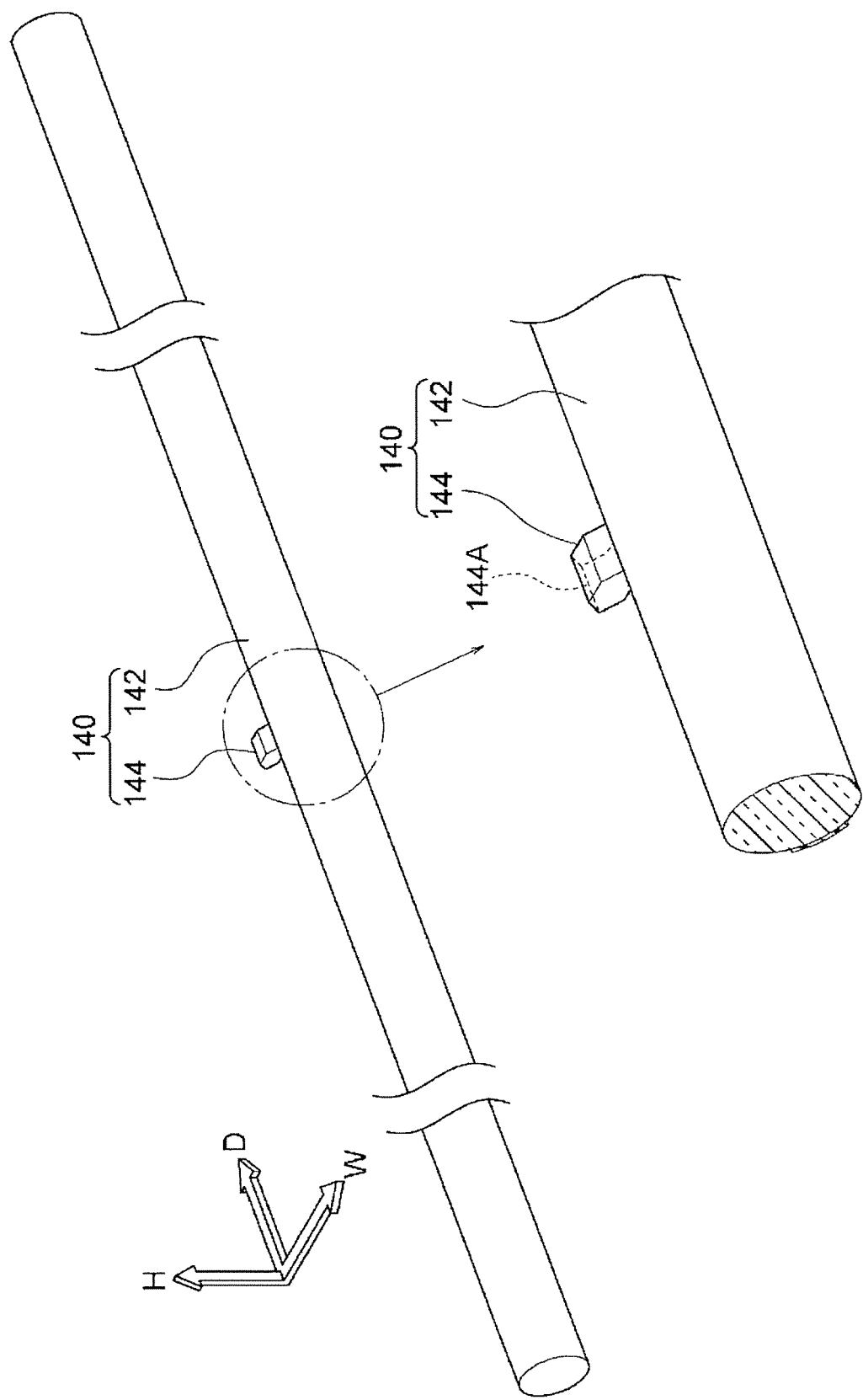
FIG. 11 is a perspective view illustrating a light-guide member of the image reading device according to the exemplary embodiment of the present invention.
Figure 12:
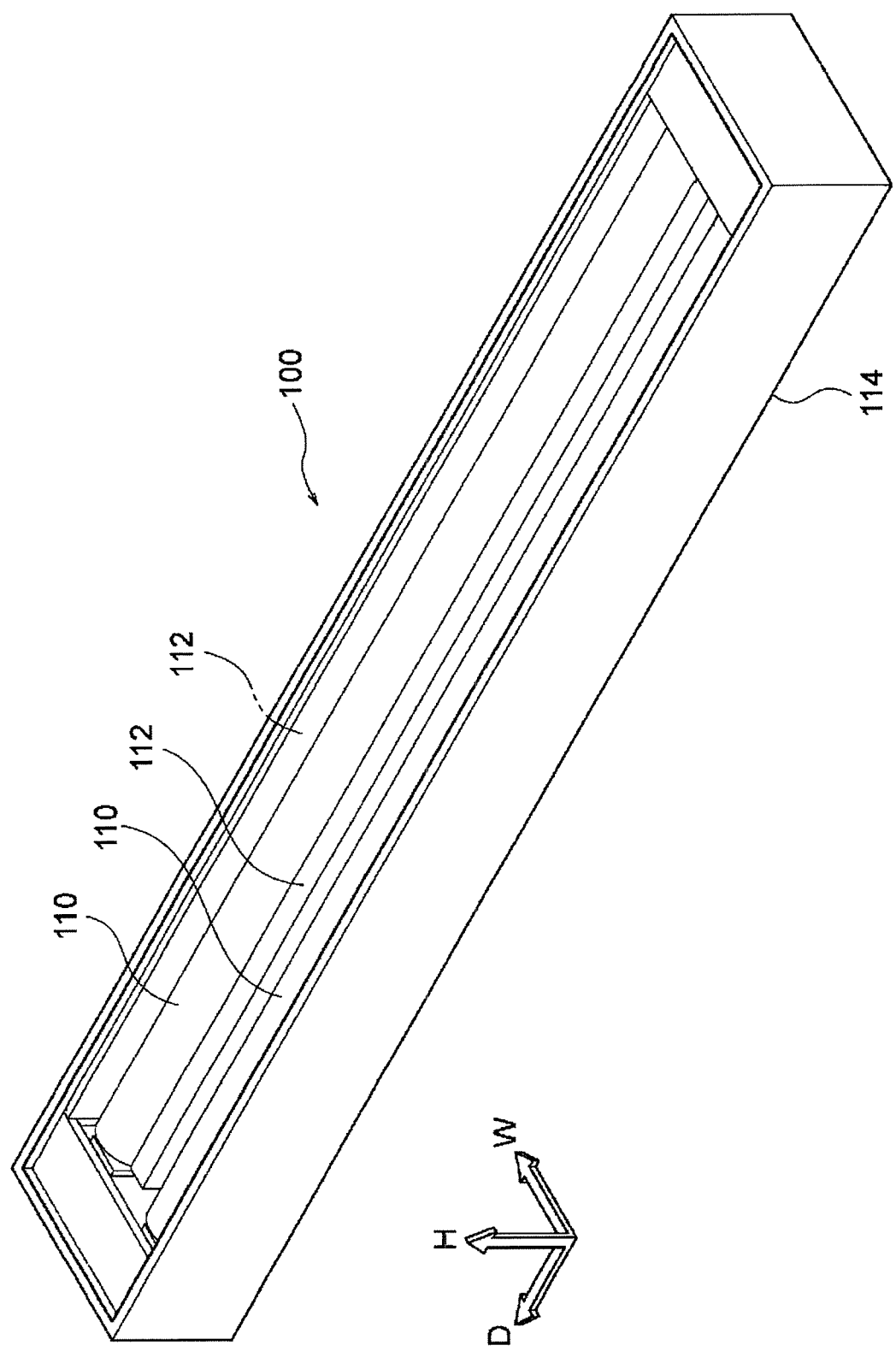
FIG. 12 is a perspective view illustrating the image reading device according to the exemplary embodiment of the present invention.

As illustrated in FIG. 1 and FIG. 11, the light-guide member 140 includes a columnar body 142 extending in the apparatus depth direction and a projecting portion 144 projecting from the surface (outer circumferential surface) of the body 142 and is integrally formed of a transparent resin material (e.g., an acrylic resin). The apparatus depth direction is an example of one direction.

The projecting portion 144 projects outward in the apparatus width direction from a center portion of the body 142 (the light-guide member 140) in the longitudinal direction of the body 142 at a position on the upper side and on the outer side (the side opposite to the central plane M1) in the apparatus width direction of the center portion. An end portion of the projecting portion 144 has an inclined surface 144A that is inclined downward toward the end of the projecting portion 144. Here, the center portion of the light-guide member 140 is a portion (region) that is located in the middle when the light-guide member 140 is divided into three equal portions in the longitudinal direction, and it is preferable that the center portion of the light-guide member 140 be a portion (region) that is located in the middle when the light-guide member 140 is divided into five equal portions in the longitudinal direction.

In addition, as illustrated in FIG. 1, the reflective layer 180 is formed on a portion of the surface of the light-guide member 140. The portion of the surface of the light-guide member 140 on which the reflective layer 180 is formed is located on the side opposite to the side on which a portion of the surface of the light-guide member 140 that faces a portion of the glass plate 118 above the rod lens array 112 (that is oriented in the direction of arrow B in FIG. 1) is present. Some of the light that is incident on the light-guide member 140 is reflected by the reflective layer 180 so as to be emitted above the rod lens array 112.

[Reflective Member 120]

As illustrated in FIG. 13, the pair of reflective members 120 are provided side by side in the apparatus width direction. In addition, the pair of reflective members 120 are accommodated in the lightguide accommodating portions 150A (see FIG. 1 and FIG. 8) of the housing 150, which will be described later, in a state of holding the respective light-guide members 140. As illustrated in FIG. 1, the pair of reflective members 120 are symmetrical in shape with respect to the central plane M1. One of the reflective members 120 that is located on the first side in the apparatus width direction (the left-hand side in FIG. 1) will be described below.

Figure 9:
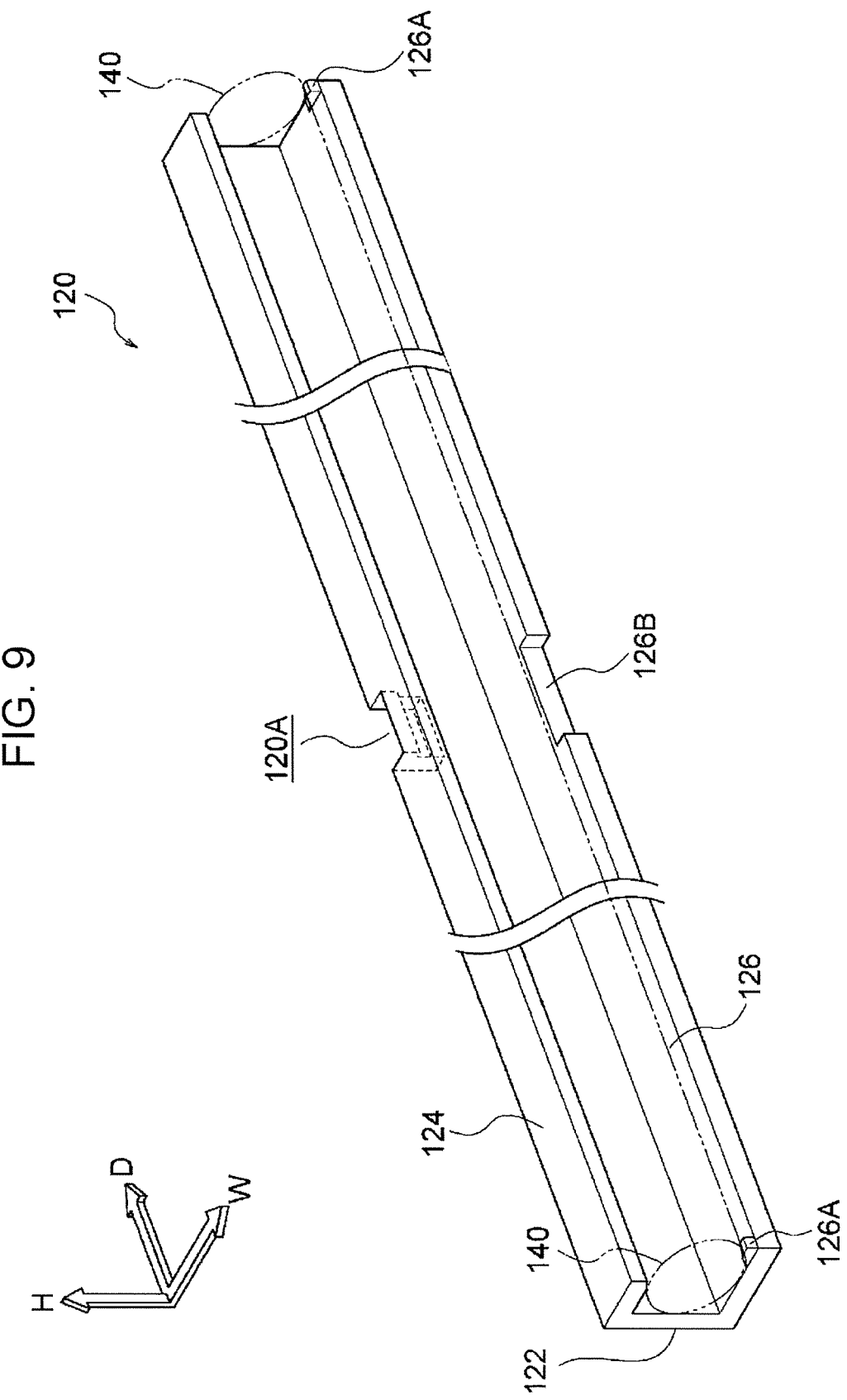
FIG. 9 is a perspective view illustrating a reflective member of the image reading device according to the exemplary embodiment of the present invention.

As illustrated in FIG. 1 and FIG. 9, the reflective member 120 extends in the apparatus depth direction and is integrally formed of a white resin material (e.g., a polycarbonate resin). The cross section of the reflective member 120 has a U shape that is open on the inner side in the apparatus width direction (that is open toward the central plane M1), and the reflective member 120 includes a bottom plate 122 having a plate surface oriented in the apparatus width direction and side plates 124 and 126 that are connected to the long edges of the bottom plate 122 and each of which has a plate surface oriented in the top-bottom direction. The side plate 126 is disposed below the side plate 124 and projects in such a manner that one of the surfaces of the side plate 126 that is farthest from the bottom plate 122 is positioned further toward the inner side in the apparatus width direction than one of the surfaces of the side plate 124 that is farthest from the bottom plate 122 is. Note that the length of each of the reflective members 120 in the apparatus depth direction and the length of each of the light-guide members 140 in the apparatus depth direction are approximately equal to each other. The side plate 126 is an example of a first side plate, and the side plate 124 is an example of a second side plate.

In a state where one of the light-guide members 140 is held in the reflective member 120, the surface of the light-guide member 140 is in contact with the plate surface of the bottom plate 122 and with the plate surface of the side plate 126. In addition, in this state, the surface of the light-guide member 140 is in contact with one of the long edges of the side plate 124. In the state where the light-guide member 140 is held in the reflective member 120, the light-guide member 140 will not come off from the reflective member 120 by only changing the position of the reflective member 120.

Figure 2:
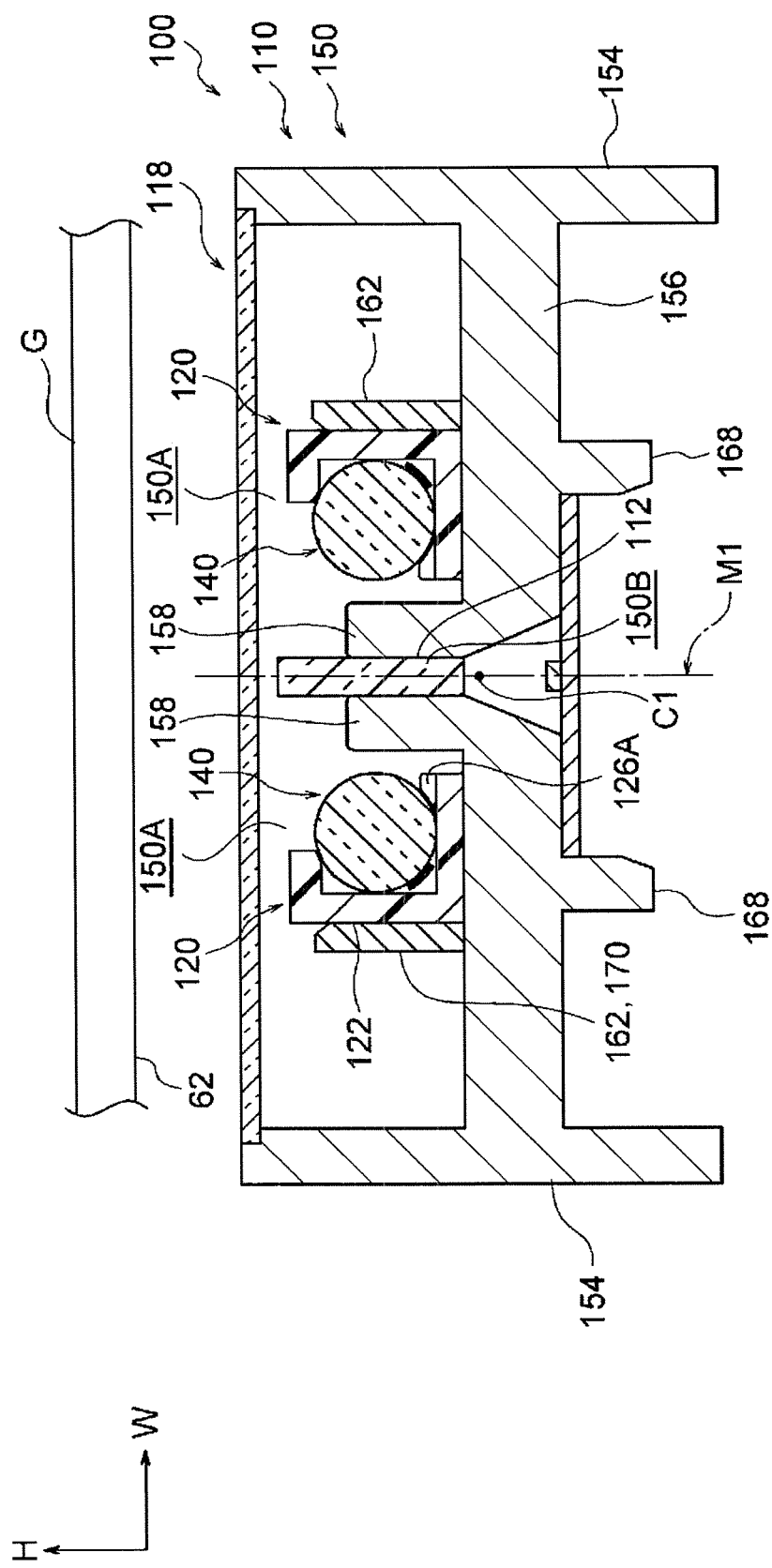
FIG. 2 is a cross-sectional view illustrating the image reading device and the light emitting device according to the exemplary embodiment of the present invention.

Protrusions 126A are formed on end portions of the side plate 126 in the apparatus depth direction integrally with the side plate 126 (see FIG. 2). The protrusions 126A protrude upward and are brought into contact with the surface of the light-guide member 140 so as to hold the light-guide member 140 in the reflective member 120. Here, the end portions of the side plate 126 are portions (regions) that are located at the opposite ends when the side plate 126 is divided into three equal portions in the longitudinal direction thereof, and it is preferable that the end portions of the side plate 126 be portions (regions) that are located at the opposite ends when the side plate 126 is divided into five equal portions in the longitudinal direction.

In addition, a recess 126B is formed in a center portion of the side plate 126 in the apparatus depth direction such that the surface of the side plate 126 that is farthest from the bottom plate 122 has a portion that is more recessed than the other portions of the surface (see FIG. 9).

A through hole 120A is formed in a portion of the reflective member 120, the portion being located at the center of the reflective member 120 in the apparatus depth direction and extending across the bottom plate 122 and the side plate 124. The through hole 120A extends through the reflective member 120 with respect to an area inside the reflective member 120 and an area outside the reflective member 120. In a state where one of the light-guide members 140 is held in the reflective member 120, as illustrated in FIG. 1, the projecting portion 144 of the light-guide member 140 is inserted in the through hole 120A. In this state, the inclined surface 144A of the projecting portion 144 is exposed to the outside of the reflective member 120. Note that the length of the through hole 120A in the apparatus depth direction is longer than the length of the projecting portion 144 in the apparatus depth direction.

In this configuration, the reflective member 120 reflects light that has been emitted from the surface of the light-guide member 140 and has been incident on the reflective member 120 toward the light-guide member 140. In a state where the reflective member 120 is holding the light-guide member 140, when the temperature changes, the light-guide member 140 expands and contracts in the apparatus depth direction. That is to say, the light-guide member 140 is sandwiched between the protrusions 126A of the reflective member 120 and the bottom plate 122 and is held in the reflective member 120 without being restrained from expanding or contracting in the longitudinal direction thereof. In other words, the light-guide member 140 will not be deformed in the radial direction thereof due to temperature changes.

[Rod Lens Array 112]

The rod lens array 112 is accommodated in a lens accommodating portion 150B (see FIG. 1 and FIG. 8) of the housing 150, which will be described later. As illustrated in FIG. 13, the external shape of the rod lens array 112 is a rectangular parallelepiped shape extending in the apparatus depth direction. The rod lens array 112 includes plural rod lenses (not illustrated) that are formed to vertically extend and that are arranged in the apparatus depth direction.

[Glass Plate]

Figure 10:
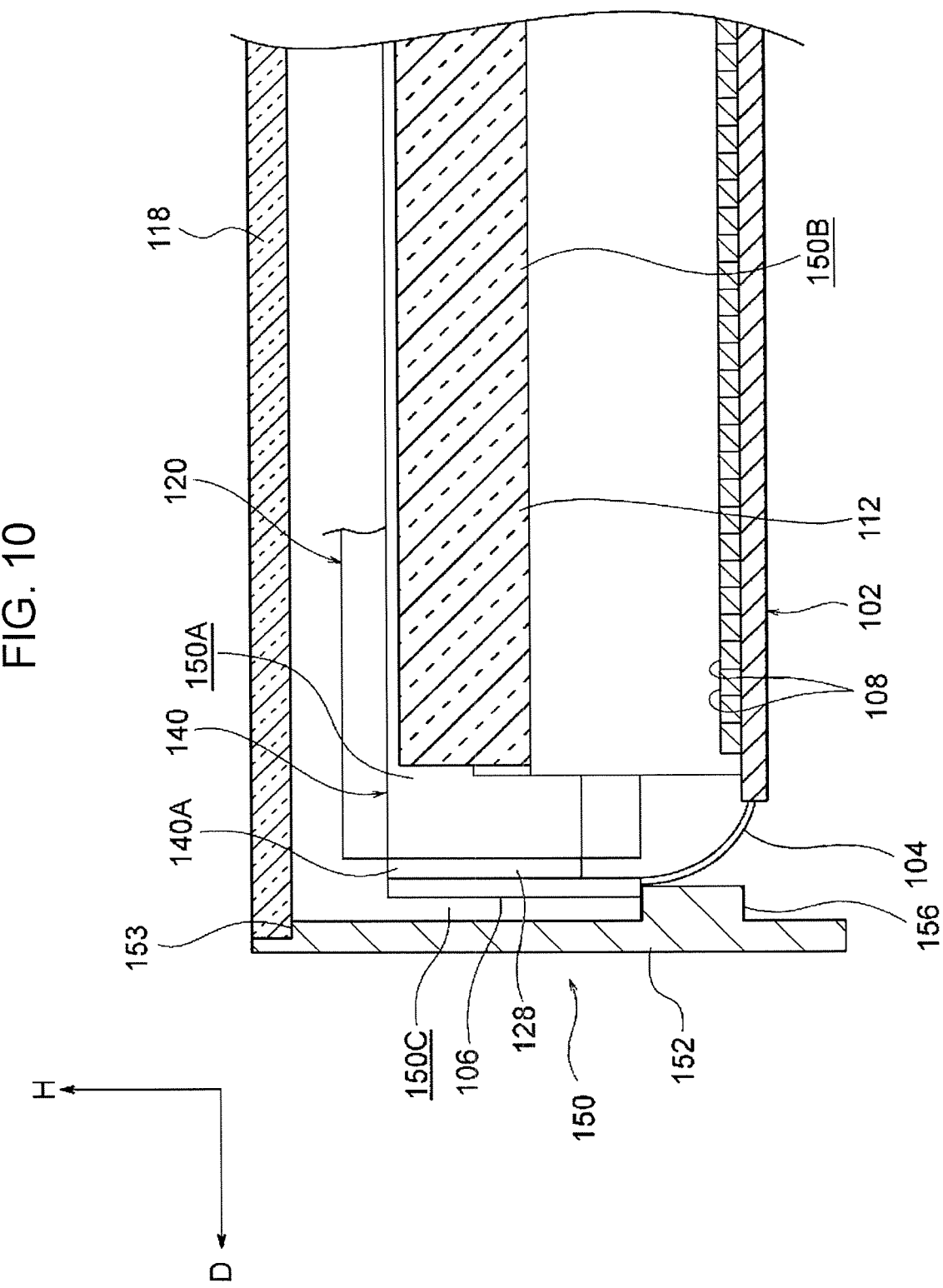
FIG. 10 is a sectional view illustrating the image reading device according to the exemplary embodiment of the present invention.

The glass plate 118 is disposed so as to cover the top surface of the housing 150 (see FIG. 10). As illustrated in FIG. 13, a plate surface of the glass plate 118 is oriented in the top-bottom direction, and when viewed from above, the glass plate 118 has a rectangular shape extending in the apparatus depth direction.

[Light Receiving Board 102]

As illustrated in FIG. 1, the light receiving board 102 is disposed in such a manner as to be in contact with the bottom surface of a support plate 156 that is included in the housing 150. A plate surface of the light receiving board 102 is oriented in the top-bottom direction, and plural light receiving elements 108 are mounted on the top surface of the light receiving board 102 and are arranged in the apparatus depth direction (see FIG. 13).

[Wiring Cable 104]

The pair of wiring cables 104 are provided as illustrated in FIG. 13 such that the base ends thereof are connected to the end portions of the light receiving board 102 in the apparatus depth direction and are so-called flexible flat cables. The base end of one of the wiring cables 104 is connected to the end portion of the light receiving board 102 that is located on the far side in the apparatus depth direction (the right-hand side in FIG. 13), and the base end of the other of the wiring cables 104 is connected to the end portion of the light receiving board 102 that is located on the near side in the apparatus depth direction (the left-hand side in FIG. 13).

[Board 106, Light Emitting Element 128]

The pair of boards 106 are provided as illustrated in FIG. 13 such that each of the boards 106 is connected to the tip end of one of the wiring cables 104. The pair of boards 106 each have a plate surface oriented in the apparatus depth direction and are spaced apart from each other in the apparatus depth direction.

A pair of the light emitting elements 128 are mounted on each of the boards 106. More specifically, a pair of the light emitting elements 128 are mounted on a surface of each of the boards 106, the surface facing the other of the boards 106, and are arranged in the apparatus width direction.

[Housing 150]

Figure 8:
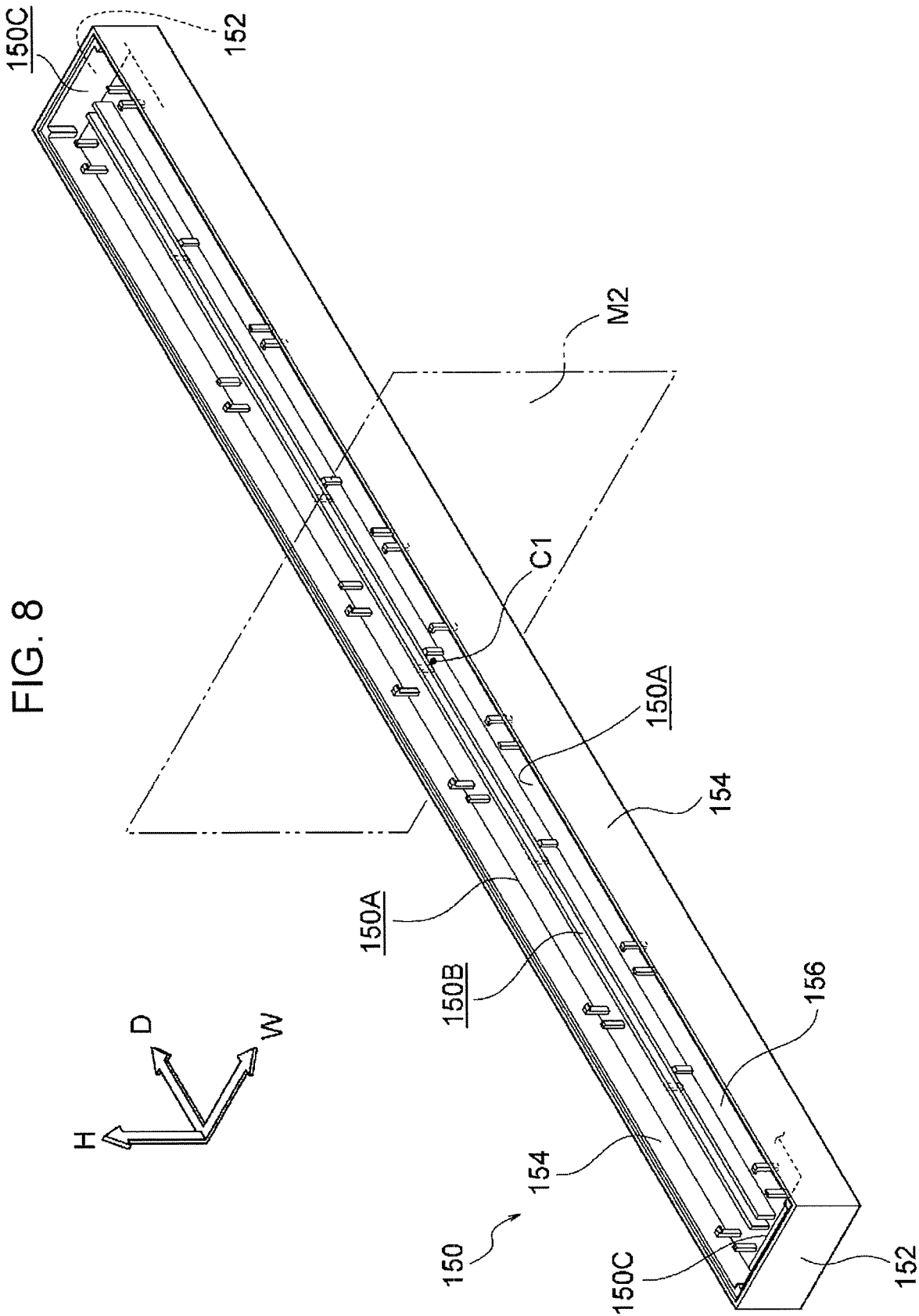
FIG. 8 is a perspective view illustrating the entirety of the housing of the image reading device according to the exemplary embodiment of the present invention.

As illustrated in FIG. 8 and FIG. 13, the housing 150 extends in the apparatus depth direction. More specifically, the housing 150 includes a pair of side plates 152 that are spaced apart from each other in the apparatus depth direction and each of which has a plate surface oriented in the apparatus depth direction and a pair of side plates 154 that are connected to end portions of the pair of side plates 152 and spaced apart from each other in the apparatus width direction and each of which has a plate surface oriented in the apparatus width direction. The housing 150 further includes the support plate 156 that is surrounded by the pair of side plates 152 and the pair of side plates 154 and that has a plate surface oriented in the top-bottom direction. The support plate 156 is disposed in such a manner that a space surrounded by the pair of side plates 152 and the pair of side plates 154 is divided by the support plate 156 in the top-bottom direction.

The pair of lightguide accommodating portions 150A, in each of which one of the light-guide members 140 that are held by the reflective members 120 is accommodated, and the lens accommodating portion 150B, in which the rod lens array 112 is accommodated, are formed in the housing 150. In addition, in the housing 150, a pair of board accommodating portions 150C in each of which one of the boards 106 is accommodated are formed with the lightguide accommodating portions 150A interposed therebetween in the apparatus depth direction.

—Lightguide Accommodating Portion 150A—

As illustrated in FIG. 2 and FIG. 8, the pair of lightguide accommodating portions 150A are formed side by side in the apparatus width direction above the support plate 156 and extend in the apparatus depth direction. The pair of lightguide accommodating portions 150A are symmetrical in shape with respect to the central plane M1. In addition, each of the pair of lightguide accommodating portions 150A is symmetrical in shape with respect to a central plane M2 (see FIG. 8) that passes through the center C1 of the image reading device 100 and that is oriented in the apparatus depth direction. One of the lightguide accommodating portions 150A that is located on the first side in the apparatus width direction (the left-hand side in FIG. 2) will be described below.

Figure 6:
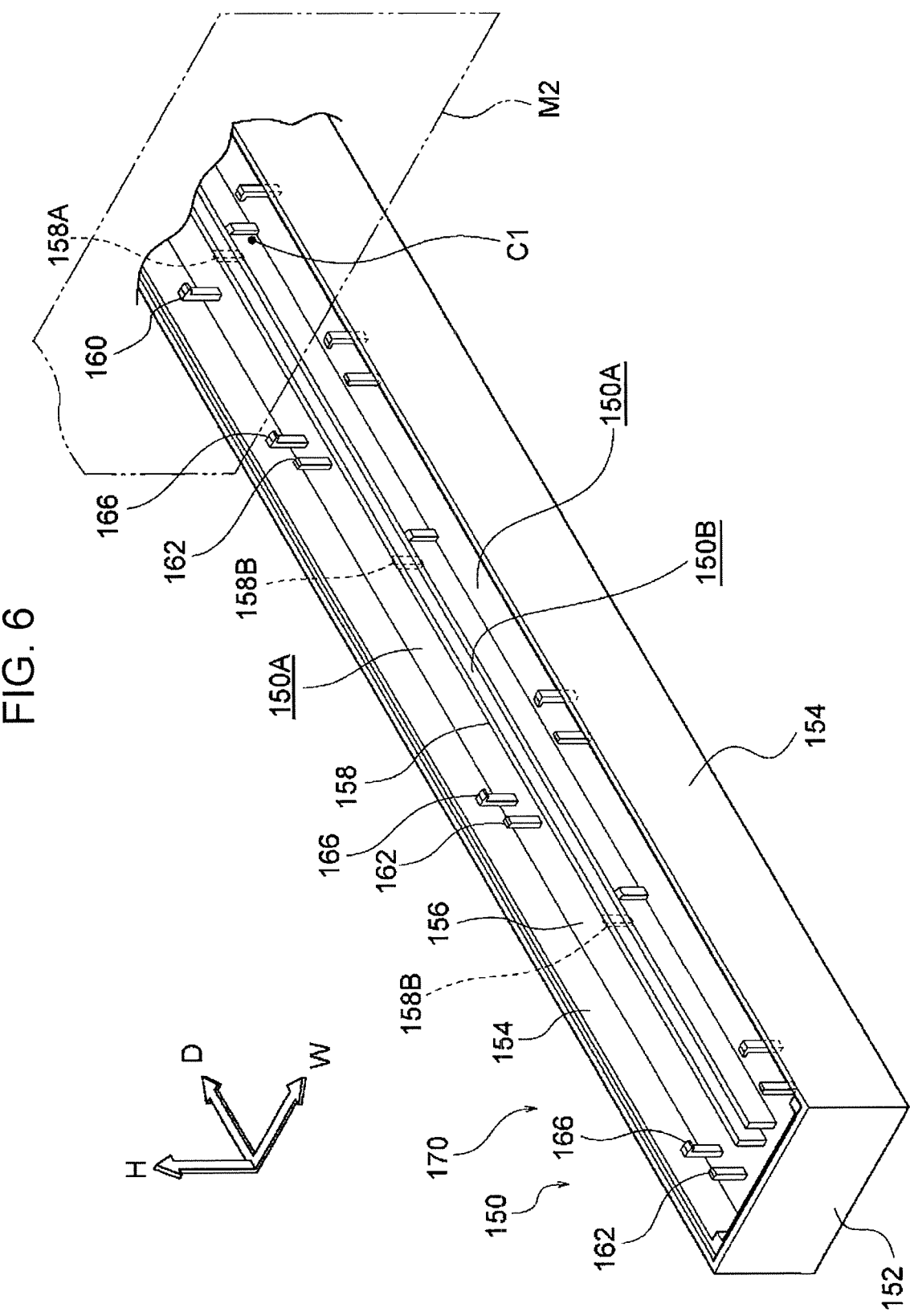
FIG. 6 is an enlarged perspective view illustrating the housing of the image reading device according to the exemplary embodiment of the present invention.

As illustrated in FIG. 2 and FIG. 6, one of partition plates 158 extending from the support plate 156 in a direction away from the support plate 156 is formed in an area inside the lightguide accommodating portion 150A in the apparatus width direction, and the partition plate 158 partitions the lightguide accommodating portion 150A and the lens accommodating portion 150B from each other. The partition plate 158 has a plate surface oriented in the apparatus width direction, and when viewed in the apparatus width direction, the partition plate 158 has a rectangular shape extending in the apparatus depth direction. The end portions of the partition plate 158 in the apparatus depth direction are spaced apart from the respective side plates 152 in the apparatus depth direction. Note that, as illustrated in FIG. 2, one of the partition plates 158 that partitions the lightguide accommodating portion 150A that is located on the first side in the apparatus width direction and the lens accommodating portion 150B from each other and the other of the partition plates 158 that partitions the lightguide accommodating portion 150A that is located on the second side in the apparatus width direction and the lens accommodating portion 150B from each other are spaced apart from each other in the apparatus width direction.

Figure 5:
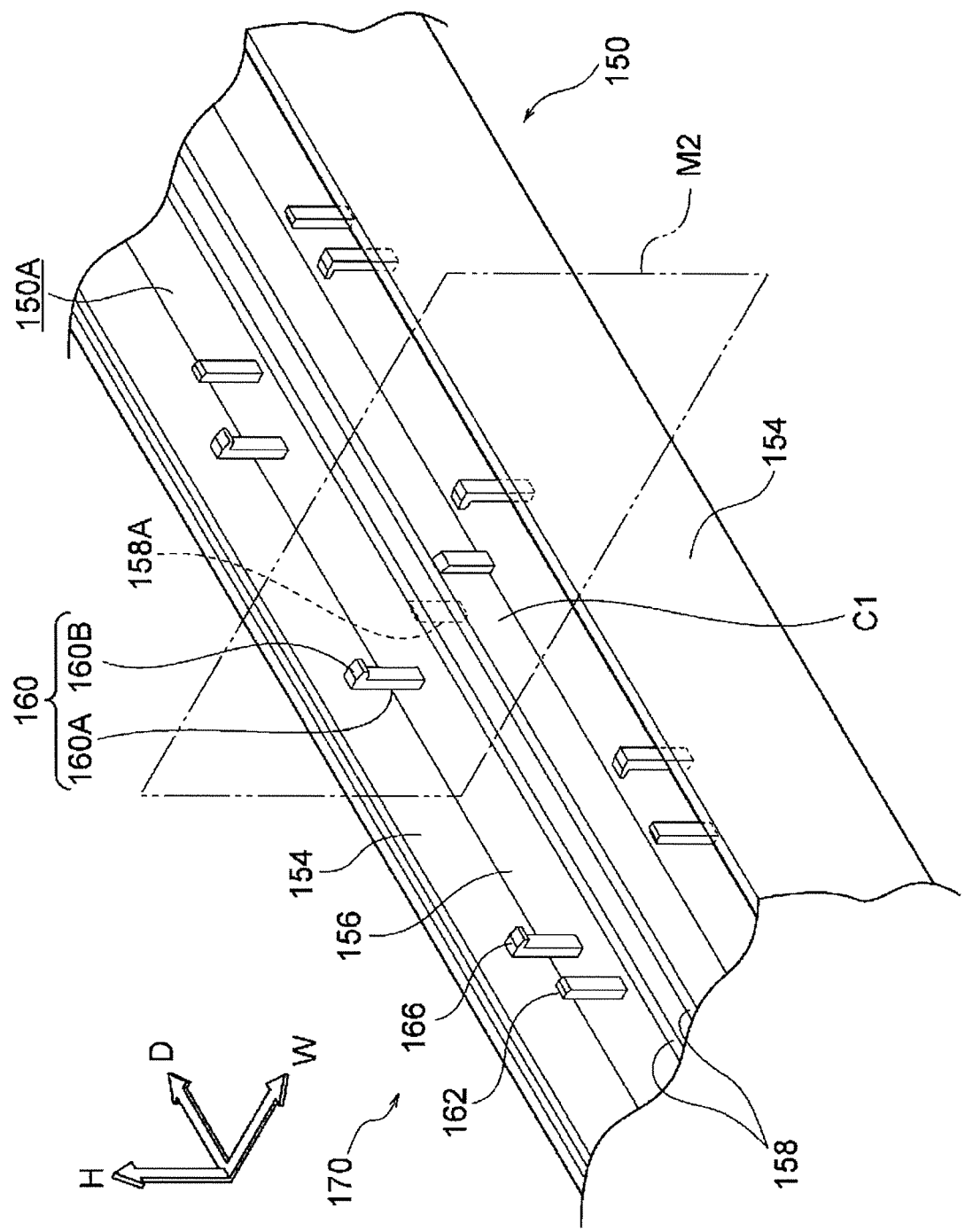
FIG. 5 is an enlarged perspective view illustrating a housing of the image reading device according to the exemplary embodiment of the present invention.

A protrusion 158A is formed on a surface of a portion of each of the partition plates 158 that faces outward in the apparatus width direction, the portion being at the center of the partition plate 158 in the apparatus depth direction, and the protrusion 158A is brought into contact with the surface of one of the light-guide member 140 accommodated in the corresponding lightguide accommodating portion 150A (see FIG. 1 and FIG. 5).

In addition, as illustrated in FIG. 1 and FIG. 5, a pressing portion 160 is formed on the support plate 156 at a position facing the protrusion 158A in the apparatus width direction in such a manner as to extend in the direction away from the support plate 156, and the pressing portion 160 presses the light-guide member 140 against the protrusion 158A. The pressing portion 160 has an L shape when viewed in the apparatus depth direction and includes a base portion 160A extending in the top-bottom direction and a bent portion 160B extending inward in the apparatus width direction from an end of the base portion 160A.

The bent portion 160B has a contact surface 160C that is formed so as to be brought into surface contact with the inclined surface 144A of the projecting portion 144 of the light-guide member 140. The base portion 160A of the pressing portion 160 is elastically deformed in a state where the contact surface 160C of the pressing portion 160 is in contact with the inclined surface 144A of the projecting portion 144 of the light-guide member 140.

In this configuration, the pressing portion 160 presses the light-guide member 140 against the protrusion 158A of the housing 150 in the apparatus width direction. In addition, the pressing portion 160 presses the light-guide member 140 against the support plate 156 of the housing 150 via the side plate 126 of the corresponding reflective member 120 in the top-bottom direction of the image forming apparatus 10 (hereinafter referred to as apparatus top-bottom direction). In this manner, the pressing portion 160 of the housing 150 causes the light-guide member 140 to be held on the housing 150 by clamping the light-guide member 140 at one point in the apparatus width direction (crossing direction) that crosses the apparatus depth direction. More specifically, the pressing portion 160 of the housing 150 causes the light-guide member 140 to be held on the housing 150 by clamping a portion of a center portion of the light-guide member 140 in the apparatus depth direction. In this manner, the light-guide member 140 is held on the housing 150 without using another component that is different from the housing 150.

Figure 3:
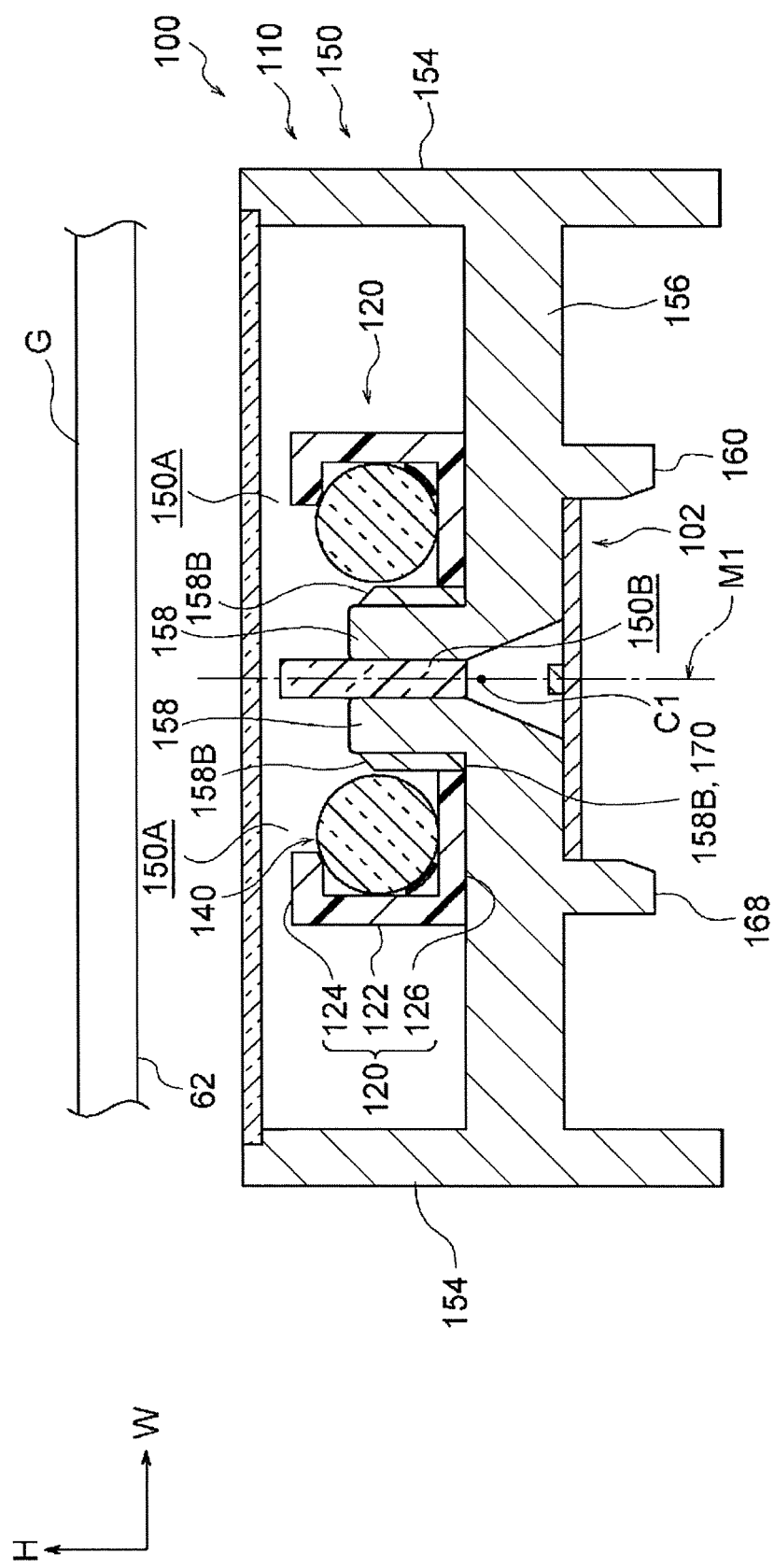
FIG. 3 is a cross-sectional view illustrating the image reading device and the light emitting device according to the exemplary embodiment of the present invention.

As illustrated in FIG. 6, in each of the partition plates 158, protrusions 158B that are brought into contact with the surface of the side plate 126 of one of the reflective members 120 that is farthest from the bottom plate 122 are formed between the protrusion 158A and the end portions of the partition plate 158 in the longitudinal direction of the partition plate 158 with a gap therebetween in the apparatus depth direction (see FIG. 3). Each of the protrusions 158B is an example of a first restricting portion.

More specifically, the protrusions 158B protrude from a surface of the partition plate 158 that faces outward in the apparatus width direction. The protrusions 158B are arranged in such a manner that the distance between one of the protrusions 158B that is positioned closest to the protrusion 158A and the protrusion 158A, the distance between one of the protrusions 158B that is positioned closest to one of the end portions of the partition plate 158 and the end portion of the partition plate 158, and the distance between the adjacent protrusions 158B are approximately equal to one another.

As illustrated in FIG. 6, plural pressing portions 162 that press the reflective member 120 against the protrusions 158B are formed at positions that are displaced from the protrusions 158B in the apparatus width direction in such a manner as to be spaced apart from one another in the apparatus depth direction. More specifically, the pressing portions 162 extend from the support plate 156 in the direction away from the support plate 156 and are elastically deformed in a state of being in contact with the bottom plate 122 of the reflective member 120 from the outside in the apparatus width direction as illustrated in FIG. 2.

As illustrated in FIG. 6, holding portions 166 that hold the reflective member 120 are formed at positions that are displaced from the protrusions 158B in the apparatus width direction in such a manner as to be aligned with the pressing portions 162 in the width depth direction and to be spaced apart from one another in the apparatus depth direction. More specifically, the holding portions 166 extend from the support plate 156 in the direction away from the support plate 156. Each of the holding portions 166 is an example of a second restricting portion.

Figure 4:
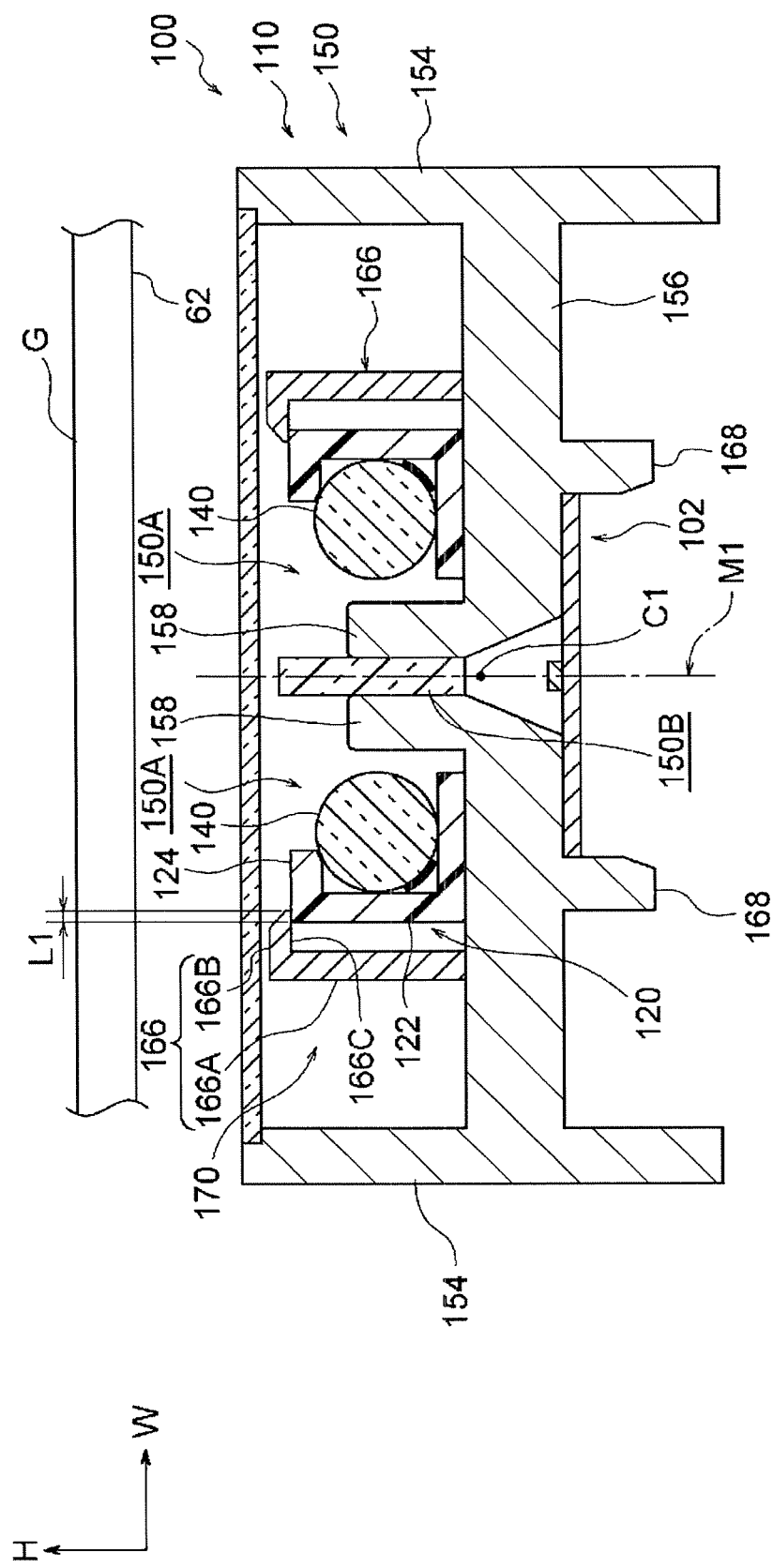
FIG. 4 is a cross-sectional view illustrating the image reading device and the light emitting device according to the exemplary embodiment of the present invention.

As illustrated in FIG. 4, each of the holding portions 166 has an L shape when viewed in the apparatus depth direction and includes a base portion 166A extending in the top-bottom direction and a bent portion 166B extending inward in the apparatus width direction from an end of the base portion 166A. The bent portion 166B has a contact surface 166C that is formed so as to be brought into contact with the side plate 124 from above. When viewed in the apparatus depth direction, the contact surface 166C extends in the apparatus width direction (crossing direction).

Note that a contact allowance (denoted by L1 in FIG. 4) between the contact surface 166C and the side plate 124 in the apparatus width direction may have any length as long as the contact surface 166C and the side plate 124 are in contact with each other even if variations in mounting positions and variations in component dimensions occur and is set to 0.3 mm as an example in the present exemplary embodiment.

In this configuration, the pressing portions 162 press the reflective member 120 against the protrusions 158B in the apparatus width direction (see FIG. 2 and FIG. 3). In addition, the holding portions 166 are in contact with the side plate 124 of the reflective member 120 in the apparatus top-bottom direction (another crossing direction) so as to restrict upward movement of the reflective member 120, which is placed on the top surface of the support plate 156. In this manner, the housing 150 holds the reflective member 120 at the accommodating position of the reflective member 120. In other words, the pressing portions 162 and the protrusions 158B restrict movement of the reflective member 120 in the apparatus width direction, and the holding portions 166 and the top surface of the support plate 156 restrict movement of the reflective member 120 in the apparatus top-bottom direction. In this manner, the housing 150 holds the reflective member 120.

The pressing portions 162, the protrusions 158B, the holding portions 166 are included in a holding unit 170 that causes the reflective member 120 to be held on the housing 150.

—Lens Accommodating Portion 150B—

As illustrated in FIG. 1 and FIG. 8, the lens accommodating portion 150B is formed between the pair of lightguide accommodating portions 150A in the apparatus width direction and extends in the apparatus depth direction. More specifically, the lens accommodating portion 150B is formed between the pair of partition plates 158. The lens accommodating portion 150B extends through the support plate 156 in the top-bottom direction. In addition, the end portions of the lens accommodating portion 150B in the apparatus depth direction are spaced apart from the respective side plates 152 in the apparatus depth direction.

In this configuration, the rod lens array 112 is accommodated in the lens accommodating portion 150B of the housing 150 and fixed to the lens accommodating portion 150B by a fixing member (not illustrated).

—Board Accommodating Portion—

As illustrated in FIG. 13, the pair of board accommodating portions 150C are formed on the far side and the near side in the apparatus depth direction with respect to the lightguide accommodating portions 150A. More specifically, as illustrated in FIG. 10, each of the board accommodating portions 150C is formed between one of the side plates 152, which are positioned at the ends of the housing 150 in the apparatus depth direction, and the lightguide accommodating portions 150A and extends through a portion of the support plate 156 in the top-bottom direction.

In this configuration, the boards 106, on which the light emitting elements 128 are mounted, are accommodated in the respective board accommodating portions 150C of the housing 150. In this state, each of the light emitting elements 128 faces an end surface 140A of a corresponding one of the light-guide members 140 and is in contact with the end surface 140A of the light-guide member 140. In other words, all the end surfaces 140A of the light-guide members 140 are in contact with the respective light emitting elements 128.

—Others—

As illustrated in FIG. 1 and FIG. 10, step portions 153 that support edge portions of the glass plate 118 from below are formed in an upper portion of the housing 150. In this configuration, the glass plate 118 is fixed to the housing 150 by a fixing unit (not illustrated) and covers the top surface of the housing 150 in a state where the edge portions of the glass plate 118 are in contact with the step portions 153 of the housing 150.

As illustrated in FIG. 1, a pair of projecting portions 168 are formed on the bottom surface of the support plate 156 of the housing 150 with the central plane M1 interposed between the pair of projecting portions 168 and project downward. The pair of projecting portions 168 extend in the apparatus depth direction, and the end portions of each of the pair of projecting portions 168 are spaced apart from the side plates 152 (see FIG. 13) of the housing 150 in the apparatus depth direction. In this configuration, the light receiving board 102 is fixed to the housing 150 by a fixing unit (not illustrated) at a position between the pair of projecting portions 168 while being in contact with the bottom surface of the support plate 156. In this state, the light receiving elements 108, which are mounted on the light receiving board 102, face the rod lens array 112 in the top-bottom direction.

(Operation)

Operation of the image reading device 100 will now be described.

The light emitting elements 128 of the light emitting device 110 radiate light onto the end surfaces 140A of the light-guide members 140 (see FIG. 10). As a result, the light that enters the light-guide members 140 through the end surfaces 140A travels the inside of the light-guide members 140 in the longitudinal direction of the light-guide members 140. Then, as illustrated in FIG. 1, the light-guide members 140 emit the light above the rod lens array 112 (in the direction of arrow B in FIG. 1).

More specifically, part of the light that has entered the light-guide members 140 through the end surfaces 140A is reflected by the reflective layer 180 so as to be emitted above the rod lens array 112. In addition, another part of the light that has entered the light-guide members 140 through the end surfaces 140A is emitted from the surfaces of the light-guide members 140, is incident on the reflective member 120, is reflected by the reflective members 120, and enters again the light-guide members 140 through the surfaces of the light-guide members 140. This part of light that has entered again the light-guide members 140 through the surfaces of the light-guide members 140 is emitted above the rod lens array 112. Furthermore, another part of the light that has entered the light-guide members 140 through the end surfaces 140A is directly emitted above the rod lens array 112.

The rod lens array 112 guides (converges) the light that is emitted from the light-guide members 140, radiated onto one of the documents G (an object on which an image has been formed), and reflected by the document G to (onto) the light receiving elements 108. The light receiving elements 108 receives the light reflected by the document G and converts the light into an electrical signal.

An operation for replacing the reflective members 120 and the light-guide members 140, which deteriorate with time, that is performed when the image reading device 100 removed from the market is recycled will now be described.

An operation of removing the reflective members 120 and the light-guide members 140 from the housing 150 will be described first. Here, an operation of removing one of the reflective members 120 and one of the light-guide members 140 each of which is located on the first side in the apparatus width direction (the left-hand side in FIG. 1) from the housing 150 will be described. Note that, for convenience of description, the holding portions 166 will hereinafter be referred to as holding portions 166-1, 166-2, 166-3, and so on as illustrated in FIG. 7 in order starting from the holding portion 166 that is located further toward the near side in the apparatus depth direction than the other holding portions 166 are to the holding portion 166 located further toward the far side in the apparatus depth direction than the other holding portions 166 are.

First, an operator removes the glass plate 118 from the housing 150 so as to expose the interior of the housing 150. Then, as illustrated in FIG. 7, the operator presses a portion of the reflective member 120 that is in contact with the holding portion 166-1, which is located further toward the near side in the apparatus depth direction than the other holding portions 166 are, toward the inner side in the apparatus width direction (in the direction of arrow P1 in FIG. 7). As a result, the reflective member 120 is bent toward the inner side in the apparatus width direction, and the portion of the reflective member 120 and the holding portion 166-1 are separated from each other in the apparatus width direction. This allows the reflective member 120 to be released from the state of being held. In addition, the operator causes the reflective member 120 to be bent upward.

Figure 7:
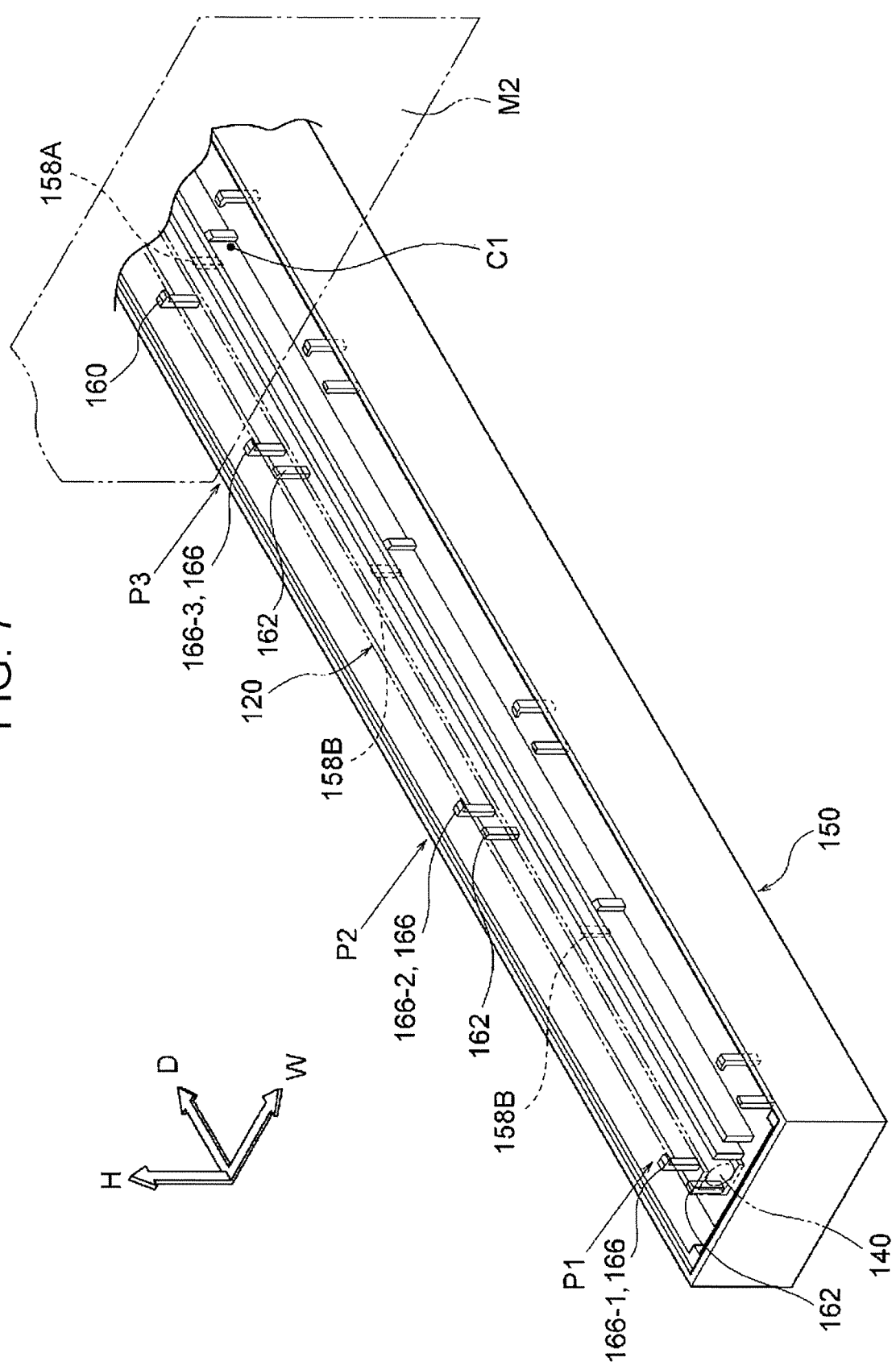
FIG. 7 is an enlarged perspective view illustrating the housing of the image reading device according to the exemplary embodiment of the present invention.

Next, the operator presses a portion of the reflective member 120 that is in contact with the holding portion 166-2, which is next to the holding portion 166-1, toward the inner side in the apparatus width direction (in the direction of arrow P2 in FIG. 7). As a result, the reflective member 120 is bent toward the inner side in the apparatus width direction, and the portion of the reflective member 120 and the holding portion 166-2 are separated from each other in the apparatus width direction. This allows the reflective member 120 to be released from the state of being held. In addition, the operator causes the reflective member 120 to be bent upward.

Next, the operator presses a portion of the reflective member 120 that is in contact with the holding portion 166-3, which is next to the holding portion 166-2, toward the inner side in the apparatus width direction (in the direction of arrow P3 in FIG. 7). As a result, the reflective member 120 is bent toward the inner side in the apparatus width direction, and the portion of the reflective member 120 and the holding portion 166-3 are separated from each other in the apparatus width direction. This allows the reflective member 120 to be released from the state of being held. In addition, the operator causes the reflective member 120 to be bent upward.

By performing the above-described operation at the above-mentioned positions and also at the other positions on the far side in the apparatus depth direction, the reflective member 120 holding the light-guide member 140 is removed from the housing 150. Note that, regarding the pressing portion 160 illustrated in FIG. 1, the contact surface 160C is in contact with the inclined surface 144A of the projecting portion 144 of the light-guide member 140, and the contact surface 160C of the pressing portion 160 is inclined upward toward the end of the pressing portion 160. Accordingly, when the light-guide member 140 moves upward, the base portion 160A of the pressing portion 160 is bent, and the contact surface 160C is moved toward the outer side in the apparatus width direction. Thus, the operation for releasing the reflective member 120 from the state of being held is not obstructed by the pressing portion 160.

Next, the operator holds the light-guide member 140 held by the reflective member 120, which is illustrated in FIG. 9, and moves the light-guide member 140 toward the inner side in the apparatus width direction with respect to the reflective member 120. As a result, the protrusions 126A of the reflective member 120 are pressed toward the inner side in the apparatus width direction, and a portion of the side plate 126 of the reflective member 120 is bent, so that the protrusions 126A are moved downward. Then, the light-guide member 140 is released from the state of being held by the reflective member 120 and detached from the reflective member 120.

When the light-guide member 140 and the reflective member 120 are mounted onto the housing 150, the light-guide member 140 is held by the reflective member 120. Then, the operator attaches the reflective member 120 holding the light-guide member 140 onto the housing 150 while causing the base portions 166A of the holding portions 166 to be bent in such a manner that the bent portion 166B of the holding portions 166, which is illustrated in FIG. 7, are moved toward the outer side in the apparatus width direction. In this manner, the reflective member 120 is mounted onto the housing 150 without using a tool for removing a screw or the like.

SUMMARY

As described above, by causing the reflective member 120 holding the light-guide member 140 to be bent, the reflective member 120 is removed from the housing 150 without using a tool for removing a screw or the like. As described above, the light-guide member 140 and the reflective member 120 are removed together (as a set) from the housing 150.

The pressing portions 162 and the protrusions 158B restrict the movement of the reflective member 120 in the apparatus width direction, and the holding portions 166 and the top surface of the support plate 156 restrict the movement of the reflective member 120 in the apparatus top-bottom direction. In this manner, the position of the reflective member 120, which is located at the accommodating position, in the apparatus width direction and the apparatus top-bottom direction is controlled.

The protrusions 126A that clamp the light-guide member 140 together with the bottom plate 122 are formed integrally with the side plate 126 of the reflective member 120. The reflective member 120 holds the light-guide member 140 by using the protrusions 126A. By integrally forming the protrusions 126A in this manner, the number of components is smaller than that in the case where a different component is used for causing the light-guide member 140 to be held by the reflective member 120.

In the image reading device 100, the workload required for, for example, repairing the light emitting device 110 is reduced to be less than that in the case where the reflective members 120 and the light-guide members 140 are removed from the housing 150 by using a tool for removing a screw or the like.

In addition, in the image forming apparatus 10, the workload required for, for example, repairing the image reading device 100 is reduced to be less than that in the case where the reflective members 120 and the light-guide members 140 are removed from the housing 150 by using a tool for removing a screw or the like.

Note that although a specific exemplary embodiment of the present invention has been described in detail, the present invention is not limited to the exemplary embodiment, and it is obvious to those skilled in the art that the present invention may employ other various exemplary embodiments within the scope of the present invention. For example, in the above-described exemplary embodiment, although the pressing portions 162 are arranged at the positions that are displaced from the protrusions 158B in the apparatus depth direction, each of the pressing portions 162 and a corresponding one of the protrusions 158B may be arranged at the same position in the apparatus depth direction.

Although not particularly described in the above exemplary embodiment, the number of the protrusions 158B, the number of the pressing portion 160, and the number of the holding portions 166 are examples and may be other numbers.

In addition, although not particularly described in the above exemplary embodiment, correction portions that are brought into contact with the light-guide members 140 so as to correct the positions of the light-guide members 140 may be formed in the housing 150.

Furthermore, in the image forming apparatus according to the above-described exemplary embodiment, although images are transferred onto the intermediate transfer belt from the photoconductor drums, each of which corresponds to one of the four colors, for example, the image forming apparatus may be configured such that an image is directly transferred onto one of the sheet members P from one of the image carriers 36 for a single color or the image carriers 36 for plural colors.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light emitting device comprising:
   a light-guide member that extends in one direction;
   a light emitting element that radiates light onto an end surface of the light-guide member;
   a reflective member that extends in the one direction and reflects, while holding the light-guide member, light that is emitted from a surface of the light-guide member; and
   a housing that accommodates the reflective member and includes a holding unit, the holding unit being configured to hold the reflective member at an accommodating position of the reflective member and configured to allow the reflective member to be released from a state of being held when the reflective member is bent in a crossing direction that crosses the one direction, and
   wherein the holding unit includes
      a plurality of first restricting portions that are arranged on a first side in the crossing direction with respect to the reflective member in such a manner as to be spaced apart from one another in the one direction and that restrict movement of the reflective member toward the first side in the crossing direction by being brought into contact with the reflective member,
      a pressing portion that is disposed on a second side in the crossing direction with respect to the reflective member and that presses the reflective member against the first restricting portions, and
      a second restricting portion that is disposed on the second side in the crossing direction with respect to the reflective member in such a marmer as to be located at a position displaced from the first restricting portions in the one direction and that restricts movement of the reflective member in another crossing direction that crosses the one direction and the crossing direction by being brought into contact with the reflective member in the other crossing direction, and
   wherein the reflective member is bent in such a manner that a portion of the reflective member that is in contact with the second restricting portion moves toward the first side in the crossing direction, so that the reflective member is allowed to be released from the state of being held.

2. The light emitting device according to claim 1,
   wherein the second restricting portion has a contact surface that is formed to be in contact with the reflective member, and
   wherein the contact surface extends in the crossing direction when viewed in the one direction.

3. The light emitting device according to claim 1,
   wherein the reflective member includes a bottom plate that extends in the one direction, a first side plate that is connected to a first edge portion of the bottom plate, and a second side plate that is connected to a second edge portion of the bottom plate, and
   wherein at least one protruding portion that holds the light-guide member by clamping the light-guide member together with the bottom plate is formed integrally with the first side plate.

4. The light emitting device according to claim 2,
   wherein the reflective member includes a bottom plate that extends in the one direction, a first side plate that is connected to a first edge portion of the bottom plate, and a second side plate that is connected to a second edge portion of the bottom plate, and
   wherein at least one protruding portion that holds the light-guide member by clamping the light-guide member together with the bottom plate is formed integrally with the first side plate.

5. The light emitting device according to claim 3,
   wherein a plurality of the protruding portions are integrally formed on opposite end portions of the first side plate in the one direction.

6. The light emitting device according to claim 4,
wherein a plurality of the protruding portions are integrally formed on opposite end portions of the first side plate in the one direction.

7. An image reading device comprising:
the light emitting device according to claim 1 that includes a light emitting element that radiates light onto an end surface of the light-guide member and causes the light to be emitted from a surface of the light-guide member toward an object on which an image has been formed;
a plurality of light receiving elements that are arranged in the one direction; and
a guide member that guides light reflected by an object on which an image has been formed to the light receiving elements.

8. An image reading device comprising:
the light emitting device according to claim 2 that includes a light emitting element that radiates light onto an end surface of the light-guide member and causes the light to be emitted from a surface of the light-guide member toward an object on which an image has been formed;
a plurality of light receiving elements that are arranged in the one direction; and
a guide member that guides light reflected by an object on which an image has been formed to the light receiving elements.

9. An image reading device comprising:
the light emitting device according to claim 3 that includes a light emitting element that radiates light onto an end surface of the light-guide member and causes the light to be emitted from a surface of the light-guide member toward an object on which an image has been formed;
a plurality of light receiving elements that are arranged in the one direction; and
a guide member that guides light reflected by an object on which an image has been formed to the light receiving elements.

10. An image reading device comprising:
the light emitting device according to claim 4 that includes a light emitting element that radiates light onto an end surface of the light-guide member and causes the light to be emitted from a surface of the light-guide member toward an object on which an image has been formed;
a plurality of light receiving elements that are arranged in the one direction; and
a guide member that guides light reflected by an object on which an image has been formed to the light receiving elements.

11. An image reading device comprising:
the light emitting device according to claim 5 that includes a light emitting element that radiates light onto an end surface of the light-guide member and causes the light to be emitted from a surface of the light-guide member toward an object on which an image has been formed;
a plurality of light receiving elements that are arranged in the one direction; and
a guide member that guides light reflected by an object on which an image has been formed to the light receiving elements.

12. An image reading device comprising:
the light emitting device according to claim 6 that includes a light emitting element that radiates light onto an end surface of the light-guide member and causes the light to be emitted from a surface of the light-guide member toward an object on which an image has been formed;
a plurality of light receiving elements that are arranged in the one direction; and
a guide member that guides light reflected by an object on which an image has been formed to the light receiving elements.

13. An image forming apparatus comprising:
the image reading device according to claim 7; and
an image forming section that forms an image based on image information read by the image reading device.

* * * * *